(12) United States Patent
Tsuchiya

(10) Patent No.: US 11,081,979 B2
(45) Date of Patent: Aug. 3, 2021

(54) VIBRATION-TYPE DRIVING APPARATUS THAT DETECTS UNDESIRED VIBRATIONS, CONTROL METHOD FOR THE VIBRATION-TYPE DRIVING APPARATUS, STORAGE MEDIUM, ROBOT, PAN HEAD FOR IMAGE PICKUP APPARATUS, AND IMAGE FORMING APPARATUS

(71) Applicant: CANON KABUSHIKI KAISHA, Tokyo (JP)

(72) Inventor: Satoshi Tsuchiya, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 626 days.

(21) Appl. No.: 15/959,469

(22) Filed: Apr. 23, 2018

(65) Prior Publication Data

US 2018/0309392 A1    Oct. 25, 2018

(30) Foreign Application Priority Data

Apr. 25, 2017  (JP) .............................. JP2017-086275
Apr. 6, 2018   (JP) .............................. JP2018-074115

(51) Int. Cl.
*H02N 2/16* (2006.01)
*H04N 5/232* (2006.01)
(Continued)

(52) U.S. Cl.
CPC ............. *H02N 2/163* (2013.01); *F16M 11/08* (2013.01); *H02N 2/142* (2013.01); *H04N 5/23261* (2013.01); *F16M 2200/042* (2013.01)

(58) Field of Classification Search
CPC ........ H02N 2/163; H02N 2/142; H01L 41/047
(Continued)

(56) References Cited

U.S. PATENT DOCUMENTS 6,100,622 A * 8/2000 Yamamoto ............. H02N 2/142
                                                    310/316.01
7,245,058 B2   7/2007 Fujimoto et al.
(Continued)

FOREIGN PATENT DOCUMENTS

JP    H03135382 A    6/1991
JP    H03139181 A    6/1991
JP    2003180092 A   6/2003

*Primary Examiner* — Derek J Rosenau
(74) *Attorney, Agent, or Firm* — Rossi, Kimms & McDowell LLP

(57) ABSTRACT

A vibration-type driving apparatus that is capable of detecting an undesired vibration in a vibrating body more accurately than conventional detection methods even if a frequency of the undesired vibration falls inside a range of driving frequencies or is an integer multiple of a driving frequency. The driven body which is brought into contact with the vibrating body is driven by generating a driving vibration in the vibrating body through application of driving voltage to the electro-mechanical energy conversion element. An electro-mechanical energy conversion element of the vibrating body has a first sensor phase and a second sensor phase placed at different locations in the vibrating body. A vibration of the vibrating body is detected by using a result of comparison between an output signal from the first sensor phase and an output signal from the second sensor phase.

15 Claims, 19 Drawing Sheets

(51) Int. Cl.
*H02N 2/14* (2006.01)
*F16M 11/08* (2006.01)

(58) Field of Classification Search
USPC .................................... 310/323.01–323.21
See application file for complete search history.

(56) References Cited

U.S. PATENT DOCUMENTS

2014/0305247 A1* 10/2014 Mori .................... G03G 15/757
                                                                74/490.05
2015/0349666 A1* 12/2015 Ifuku .................... H01L 41/257
                                                                310/323.06

\* cited by examiner

VIBRATION-TYPE DRIVING APPARATUS THAT DETECTS UNDESIRED VIBRATIONS, CONTROL METHOD FOR THE VIBRATION-TYPE DRIVING APPARATUS, STORAGE MEDIUM, ROBOT, PAN HEAD FOR IMAGE PICKUP APPARATUS, AND IMAGE FORMING APPARATUS

BACKGROUND OF THE INVENTION

Field of the Invention

The present invention relates to a vibration-type driving apparatus that detects undesired vibrations, a control method for the vibration-type driving apparatus, a storage medium, a robot, a pan head for an image pickup apparatus, and an image forming apparatus.

Description of the Related Art

There is known a vibration-type actuator which has a ring-shaped vibrating body including a piezoelectric element and excites driving vibration in the vibrating body by applying driving voltage with high frequency to the piezoelectric element. In this vibration-type actuator, a ring-shaped driven body is brought into pressure contact with the vibrating body, and as a result, the driven body is rotatively driven through a driving vibration of the vibrating body to output torque. This vibration-type actuator has properties of, for example, "generating large torque at low speed", "achieving high rotational accuracy and high positioning accuracy", and "maintaining an undriven state by frictional force". With consideration given to these properties, the vibration-type actuator is commercialized as, for example, a lens driving motor used to perform an auto-focusing operation in an image pickup apparatus such as a single-lens reflex camera. Moreover, it is lately contemplated to use the vibration-type actuator to drive an articulation of a robot arm, rotatively drive a robot hand, rotatively drive a pan head for an image pickup apparatus such as a surveillance camera, and rotatively drive a photosensitive drum of an image forming apparatus. As the scope of application of the vibration-type actuator widens, further improvements in driving performances (such as increased life expectancy, reduced noise, and increased driving accuracy) are required.

In the vibration-type actuator, an undesired vibration different from an intended driving vibration may occur. The undesired vibration is superimposed on the driving vibration and causes problems such as degradation in rotational accuracy, and therefore, the vibrating body is designed such that a natural frequency of an undesired vibration falls outside a range of frequencies of driving voltage (hereafter referred to as "the driving frequencies"). This reduces the occurrence of undesired vibrations (see, for example, Japanese Laid-Open Patent Publication (Kokai) No. 2003-180092).

Even if the vibrating body is designed such that a natural frequency of an undesired vibration falls outside the range of the driving frequencies, it is difficult to completely eliminate the possibility that an undesired vibration will occur because of variations at the time of manufacturing of the vibrating body or changes in driving environment. Therefore, when torque is output from the vibration-type actuator, it is necessary to detect an undesired vibration of the vibrating body so as to decrease the possibility that a problem will arise due to the undesired vibration.

As a method of detecting undesired vibrations, Japanese Laid-Open Patent Publication (Kokai) No. H03-135382 discloses a technique that splits an electrode for detecting vibrations in a radial direction to detect vibrations in an in-plane mode and vibrations in an out-of-plane mode. Specifically, the electrode for detecting vibrations is split into a plurality of electrodes, and one out of the three electrodes on an inner peripheral side or one out of the three electrodes on an outer peripheral side is used to detect vibrations. It should be noted that in this case, the electrodes which are for detecting vibrations and not used to detect vibrations are short-circuited. Japanese Laid-Open Patent Publication (Kokai) No. H03-139181 discloses a technique that uses an S1 phase and an S2 phase of an electrode for detecting vibration, which are provided separately in a radial direction, to detect an undesired vibration based on a signal that is a sum of an output from the S1 phase and an output from the S2 phase with a driving wave signal removed.

According to the method disclosed in Japanese Laid-Open Patent Publication (Kokai) No. H03-135382, however, when a frequency of an undesired vibration falls inside a range of driving frequencies or an integer multiple of a driving frequency, it is difficult to distinguish between the driving vibration and the undesired vibration, and it is thus feared that the undesired vibration cannot be detected with high accuracy. Moreover, according to the method disclosed in Japanese Laid-Open Patent Publication (Kokai) No. H03-139181, an output from the S1 phase and an output from the S2 phase at a certain moment are used to detect an undesired vibration. Thus, the outputs vary with measurement timing and noise, and it is feared that an undesired vibration cannot be detected with high accuracy.

SUMMARY OF THE INVENTION

The present invention provides a vibration-type driving apparatus that is capable of detecting an undesired vibration in a vibrating body more accurately than conventional detection methods even if a frequency of the undesired vibration falls inside a range of driving frequencies or is an integer multiple of a driving frequency. The present invention also provides a control method for the vibration-type driving apparatus, a storage medium, a robot, a pan head for an image pickup apparatus, and an image forming apparatus.

Accordingly, the present invention provides a vibration-type driving apparatus that has a ring-shaped vibrating body having an electro-mechanical energy conversion element and a driven body that comes into contact with the vibrating body, and drives the driven body by generating a driving vibration in the vibrating body through application of driving voltage to the electro-mechanical energy conversion element, comprising: a detection unit configured to detect a vibration of the vibrating body wherein the electro-mechanical energy conversion element has a first measurement phase and a second measurement phase placed at different locations in the vibrating body, and the detection unit detects a vibration of the vibrating body by using a result of comparison between an output signal from the first measurement phase and an output signal from the second measurement phase.

According to the vibration-type driving apparatus that is an aspect of the present invention, an undesired vibration in the vibrating body is detected more accurately than conventional detection methods even if a frequency of the undesired vibration body falls inside a range of driving frequencies or is an integer multiple of a driving frequency.

Further features of the present invention will become apparent from the following description of exemplary embodiments (with reference to the attached drawings).

DESCRIPTION OF THE EMBODIMENTS

Embodiments of the present invention will now be described in detail with reference to the accompanying drawings. First, a description will be given of a vibration-type driving apparatus according to a first embodiment of the present invention.

Figure 1:
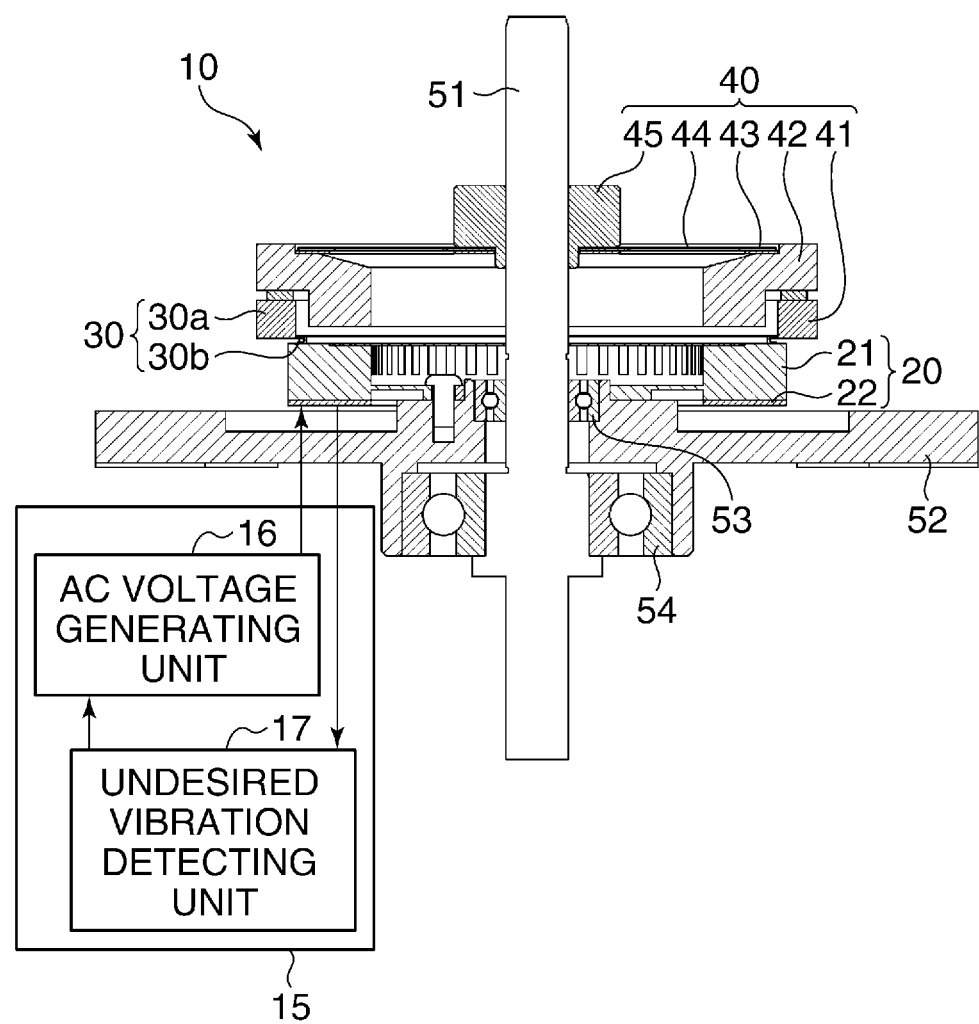
FIG. 1 is a cross-sectional view schematically showing an arrangement of a vibration-type driving apparatus according to a first embodiment of the present invention.

FIG. 1 is a cross-sectional view schematically showing an arrangement of the vibration-type driving apparatus according to the first embodiment of the present invention. Referring to FIG. 1, the vibration-type driving apparatus has a vibration-type actuator 10, and a control circuit 15 which controls torque to be output from the vibration-type actuator 10. The vibration-type actuator 10 has a ring-shaped vibrating body 20, a ring-shaped driven body 30, and a pressurization mechanism 40. The vibration-type actuator 10 also has a shaft 51, a housing 52, and bearings 53 and 54.

The vibrating body 20 has a piezoelectric element 22 which is an electro-mechanical energy conversion element, and an elastic body 21 to which the piezoelectric element 22 is joined. The driven body 30 has a main body 30a and a contact spring 30b. The driven body 30 can be made of an iron-based material such as stainless steel, but this is not limitative. The pressurization mechanism 40 has anti-vibration rubber 41, a pressure spring receiving member 42, pressure spring receiving rubber 43, a pressure spring 44, and a pressure spring fixing member 45. The vibrating body 20 and the driven body 30 are placed concentrically with respect to the shaft 51, which is a central axis, and brought into pressure contact (frictional contact) with each other with respect to a thrust direction of the shaft 51 by the pressurization mechanism 40 fixed to the shaft 51. Specifically, the pressure spring 44 inhibited from moving by the pressure spring fixing member 45 fixed to the shaft 51 presses the driven body 30 in the thrust direction via the anti-vibration rubber 41, the pressure spring receiving member 42, and the pressure spring receiving rubber 43. The pressed driven body 30 comes into pressure contact with the vibrating body 20 in a stable manner by pressing the vibrating body 20 in the thrust direction by means of the contact spring 30b. The control circuit 15 has an AC voltage generating unit 16 which generates driving voltage with an ultrasonic frequency as AC voltage, and an undesired vibration detection unit 17 (detection unit) which detects undesired vibrations, to be described later.

Figure 2:
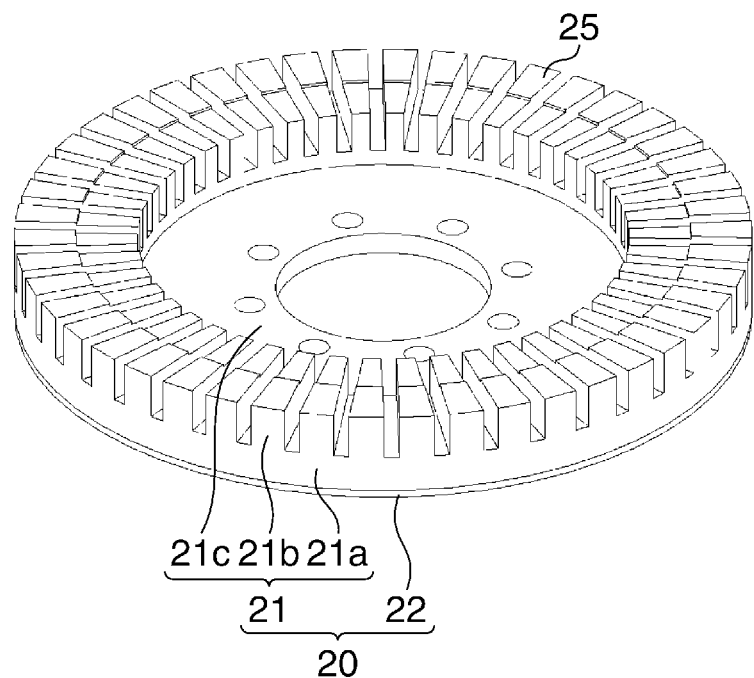
FIG. 2 is a perspective view schematically showing an arrangement of a vibration-type actuator in FIG. 1.

FIG. 2 is a perspective view schematically showing an arrangement of the vibration-type actuator 10 in FIG. 1. Referring to FIG. 2, the elastic body 21 is made of a member shaped like a round dish and has, at its peripheral edge, a plurality of projecting portions 21b which are arranged at substantially regular intervals in a circumferential direction and project in a thickness direction of the elastic body 21 (upward as viewed in the figure). The elastic body 21 can be made of a material selected as appropriate, but in the present embodiment, the elastic body 21 is made of an iron-based material such as nitrided stainless steel. The elastic body 21 has a base portion 21a which is a foundation for the projecting portions 21b, and a supporting portion 21c constituting a central part of the elastic body 21. The piezoelectric element 22 is joined to a bottom of the base portion 21a (opposite to a surface of the base portion 21a from which the projecting portions 21b project). Upper end faces of the projecting portions 21b constitute contact portions 25 which come into frictional contact with the contact spring 30b. The elastic body 21 is fixed to the housing 52, which has the bearings 53 and 54, by screwing a hole punched in the supporting portion 21c and a hole of the housing 52 together. The bearings 53 and 54 pivotally support the shaft 51.

In the vibration-type driving apparatus, the AC voltage generating unit 16 of the control circuit 15 excites a driving vibration (first progressive wave) in the vibrating body 20 by applying a driving voltage to the piezoelectric element 22 through a flexible print circuit board, not shown. A mode of the driving vibration depends on the number and configuration of a plurality of driving pattern electrodes which the piezoelectric element 22 has, and the piezoelectric element 22 is designed such that the excited progressive wave is an nth-order progressive wave progressing in a circumferential direction of the vibrating body 20. It should be noted that the nth-order driving vibration means a bending vibration in which the number of waves in a circumferential direction of the base portion 21a is n. The driving vibration generated in the piezoelectric element 22 is transmitted to the base portion 21a of the vibrating body 20, and displacement caused by the driving vibration is expanded by the projecting portions 21b. Specifically, the amount of displacement of the contact portion 25 of each projecting portion 21b is greater than that of the base portion 21a. On this occasion, each of the contact portions 25 produces an oval motion to drive the contact spring 30b, with which the contact portions 25 come into frictional contact, in the circumferential direction. Namely, the driven body 30 is rotatively driven while being kept concentric with the vibrating body 20. Here, the driven body 30 is brought into frictional contact with the pressure spring fixing member 45 by the pressure spring 44, and the pressure spring fixing member 45 fixed to the shaft 51 transmits rotary motion of the driven body 30 to the shaft 51. As a result, torque of the driven body 30 is output externally through the shaft 51.

As described earlier, in order to suppress occurrence of an undesired vibration, the vibrating body 20 is usually designed such that a natural frequency of an undesired vibration in the vibrating body 20 falls outside a range of frequencies of driving voltage (hereafter referred to as "driving frequencies"). However, an undesired vibration may unexpectedly occur in the vibrating body 20 due to factors such as low precision of contact surfaces (frictional surfaces) of the contact portions 25 and the contact spring 30b, unevenness in the distribution of contact pressure acting on the vibrating body 20 and the contact spring 30b, and mechanical machining errors in the vibrating body 20. As with a driving vibration, such an undesired vibration exhibits a progressive wave (second progressive wave) progressing in the circumferential direction of the vibrating body 20. This may cause problems such as unusual noise and reduced torque because the undesired vibration degrades quality of torque that is output in a manner being superimposed on a driving vibration. To address these problems, in the first embodiment, an undesired vibration that unexpectedly occurs is accurately detected, and when the undesired vibration is detected, a driving frequency is adjusted so that a natural frequency of the undesired vibration can fall outside a range of driving frequencies of driving voltage.

Figure 3:
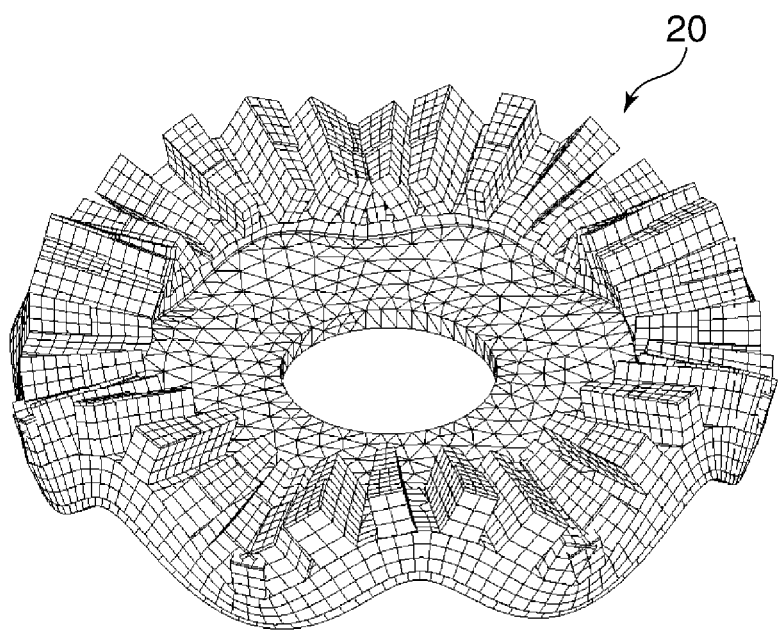
FIG. 3 is a view useful in explaining a mode of deformation caused by a driving vibration excited in a vibrating body in FIG. 2.

FIG. 3 is a view useful in explaining a mode of deformation caused by a driving vibration excited in the vibrating body 20 in FIG. 2. It should be noted that in FIG. 3, to make it easier to understand displacement caused by the driving vibration excited in the vibrating body 20, the displacement is more exaggerated than actual displacement. As shown in FIG. 3, in the first embodiment, the number and configuration of the plurality of driving pattern electrodes which the piezoelectric element 22 has are determined such that the driving vibration exhibits a seventh-order progressive wave progressing in the circumferential direction of the vibrating body 20. The number and configuration of the driving pattern electrodes which the piezoelectric element 22 has will be described later in detail with reference to FIG. 7. It should be noted that the order of the driving vibration in the vibrating body 20 of the vibration-type driving apparatus to which the present invention is applied is not limited to seven, but may be any natural number equal to or greater than one.

Figure 4:
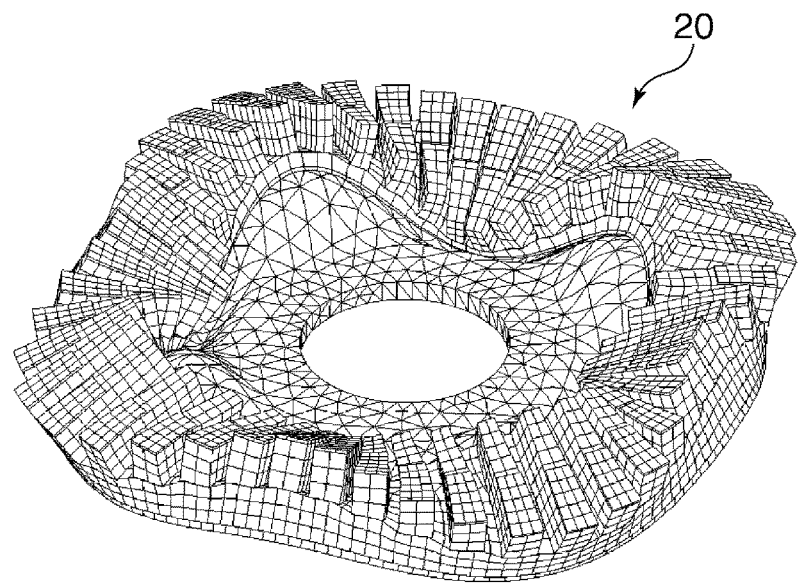
FIG. 4 is a view useful in explaining a mode of deformation caused by an undesired vibration excited in the vibrating body in FIG. 2.

FIG. 4 is a view useful in explaining a mode of deformation caused by an undesired vibration excited in the vibrating body 20. It should be noted that in FIG. 4, to make it easier to understand displacement of the undesired vibration excited in the vibrating body 20, the displacement is more exaggerated than actual displacement. As shown in FIG. 4, the first embodiment is based on the assumption that the undesired vibration exhibits a fourth-order progressive wave progressing in the circumferential direction of the vibrating body 20 due to, for example, low precision of the contact surfaces of the contact portions 25 and the contact spring 30b. Here, the undesired vibration is a vibration in a torsion mode which has a round node substantially concentric with the vibrating body 20, and vibration displacement on an inner peripheral side of the node is opposite in phase to vibration displacement on an outer peripheral side of the node. It should be noted that the order of the undesired vibration in the vibrating body 20 of the vibration-type driving apparatus to which the present invention is applied is not limited to four, but may be any natural number equal to or greater than one and different from the order of the driving vibration.

Figure 5:
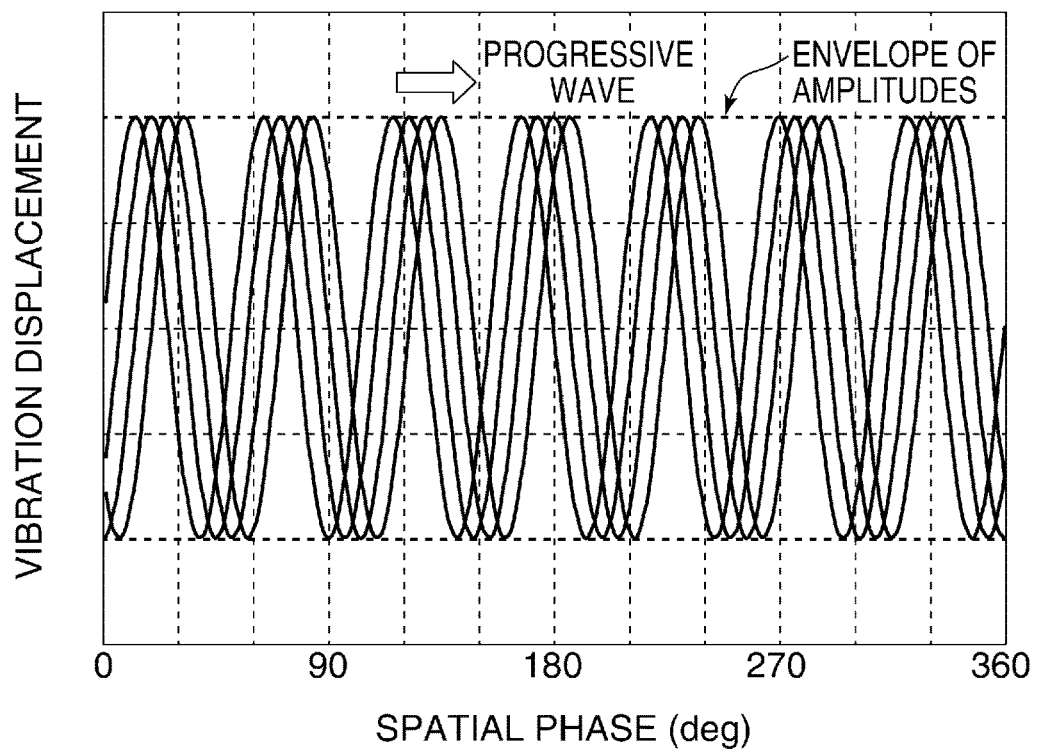
FIG. 5 is a diagram useful in explaining vibration displacement of the vibrating body in FIG. 2 in a case where only a driving vibration that exhibits a seventh-order progressive wave is excited.

FIG. 5 is a diagram useful in explaining vibration displacements of the vibrating body 20 in FIG. 2 in a case where only the driving vibration which is the seventh-order progressive wave is excited. In FIG. 5, the horizontal axis represents spatial phases that express positions of the vibrating body 20 in the circumferential direction as angles, and the vertical axis represents vibration displacements of the vibrating body 20 at respective positions in the circumferential direction. FIG. 5 also shows vibration displacements at the respective positions at four different times. As described earlier, the driving vibration is the seventh-order progressive wave, and hence if the vibration displacements at the respective positions at the four different times are combined with one another, they exhibit a seventh-order wave. The elastic body 21 and the piezoelectric element 22 of the vibrating body 20 are configured to be symmetrical with respect to a center of the vibrating body 20, and therefore, amplitudes of the driving vibration of the vibrating body 20 at the respective positions in the circumferential direction are the same. Thus, an envelope (indicated by broken lines in the figure) that connects amplitudes at the respective positions (maximum displacement of the vibration) exhibits a straight line and has no extremum.

Figure 6:
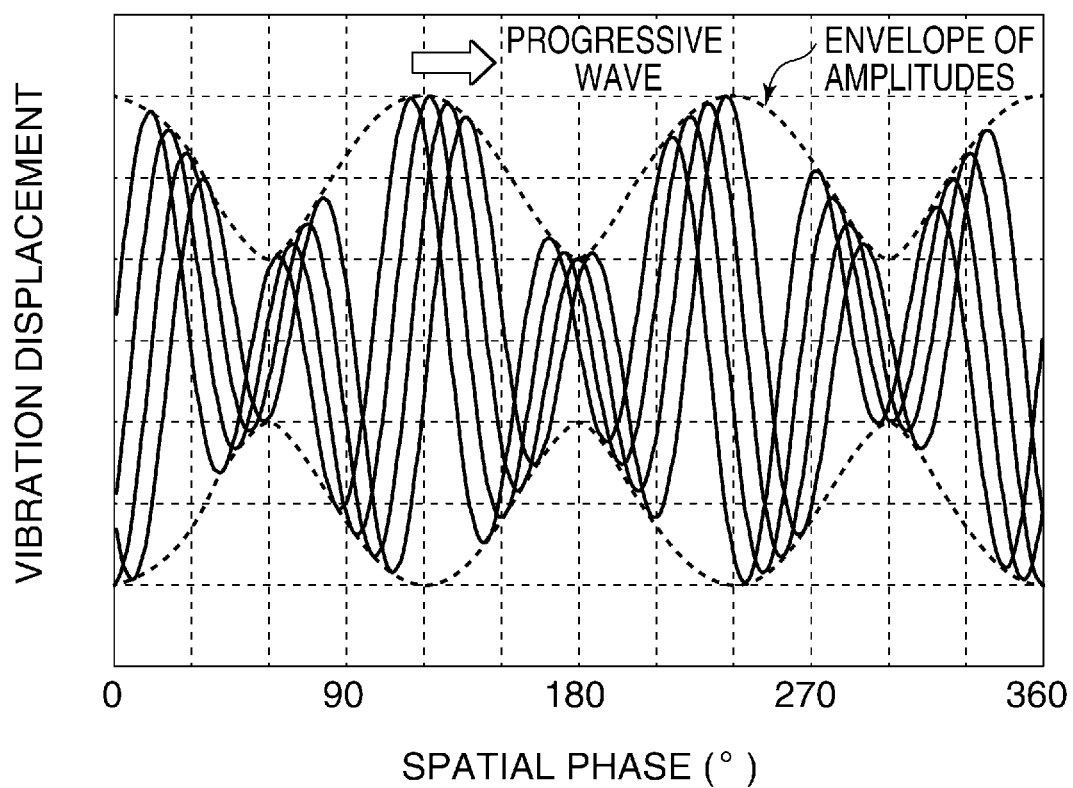
FIG. 6 is a diagram useful in explaining vibration displacement of the vibrating body in FIG. 2 in a case where an undesired vibration that exhibits a fourth-order progressive wave is superimposed on a driving vibration that exhibits a seventh-order progressive wave.

FIG. 6 is a diagram useful in explaining vibration displacements of the vibrating body 20 in FIG. 2 in a case where the undesired vibration which is the fourth-order progressive wave is superimposed on the driving vibration which is the seventh-order progressive wave. In FIG. 6, the horizontal axis represents spatial phases that represent positions of the vibrating body 20 in the circumferential direction as angles, and the vertical axis represents vibration displacements of the vibrating body 20 at respective positions in the circumferential direction as with FIG. 5. FIG. 6 also shows the vibration displacements at the respective positions at four different times. It is assumed that the ratio between the amplitude of the driving vibration and the amplitude of the undesired vibration is 2:1. As described earlier, the order of the driving vibration and the order of the undesired vibration are different, and hence when the undesired vibration is superimposed on the driving vibration, an envelope (indicated by broken lines in the figure) connecting the amplitudes at the respective positions together (maximum displacement of the vibration) is uneven due to a difference (three) between the order (seven) of the driving vibration and the order (four) of the undesired vibration. Specifically, three crests appear in the envelope. Namely, when the undesired vibration occurs, the envelope exhibits a curve as viewed in the circumferential direction of the vibrating body 20 and has extremums. In other words, the driving vibration and the undesired vibration superimposed on each other at the respective positions in the circumferential direction of the vibrating body 20 differ in amplitude. It should be noted that although FIG. 6 is based on the assumption that the ratio between the amplitude of the driving vibration and the amplitude of the undesired vibration is 2:1, the ratio between the amplitude of the driving vibration and the amplitude of the undesired vibration is not limited to this. The amplitude of the driving vibration and the undesired vibration superimposed on each other at the respective positions in the circumferential direction of the vibrating body 20 also varies with variations in the ratio between the amplitude of the driving vibration and the amplitude of the undesired vibration.

Figure 7:
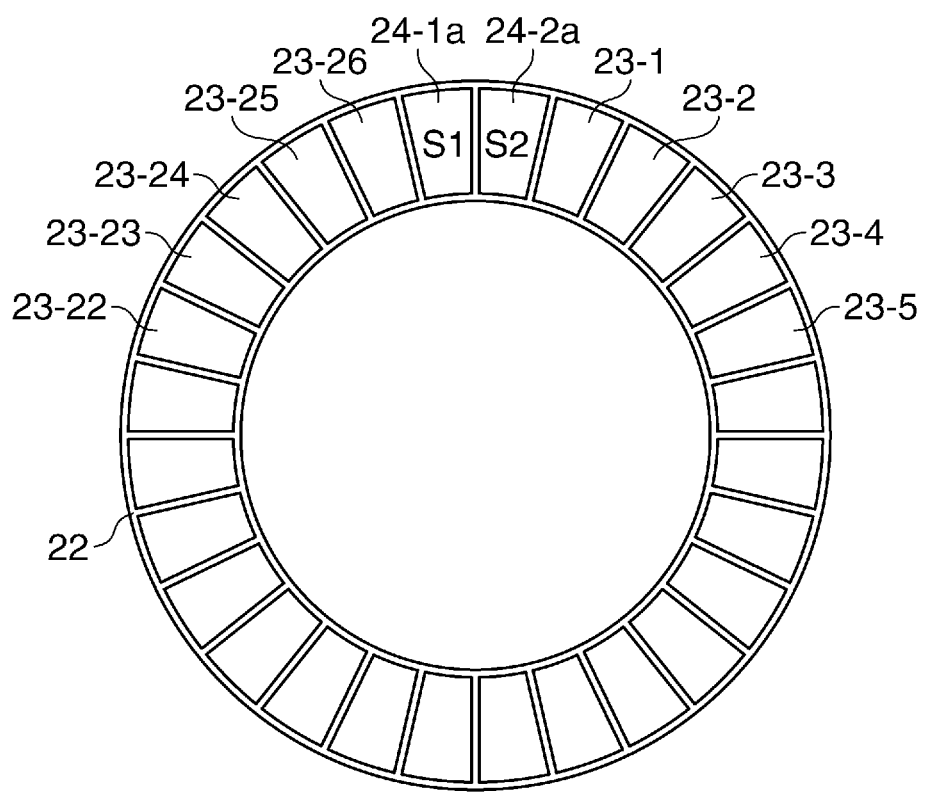
FIG. 7 is a plan view useful in explaining a configuration of a plurality of driving pattern electrodes formed in a piezoelectric element in FIG. 2.

FIG. 7 is a plan view useful in explaining the configuration of the plurality of driving pattern electrodes formed in the piezoelectric element 22 in FIG. 2. Referring to FIG. 7, for example, 26 driving pattern electrodes 23-1 to 23-26 which are driving phases are formed in the piezoelectric element 22 in sequence with pitches of a one-quarter wavelength ($\lambda$/4) of a seventh-order progressive wave over the whole circumference. The driving pattern electrodes 23-1 to 23-26 are polarized in a thickness direction, and their polarizing directions are the same. Thus, when substantially sine wave driving voltages are applied to the driving pattern electrodes 23-1 to 23-26, the driving pattern electrodes 23-1 to 23-26 expand and contract in a circumferential direction of the piezoelectric element 22. The expansion and contraction of the driving pattern electrodes 23-1 to 23-26 are transmitted to the elastic body 21 to generate bending moments along the circumferential direction of the elastic body 21. Here, the substantially sine wave driving voltages applied to the driving pattern electrodes 23-1 to 23-26 are 90° out of time phase with each other clockwise as viewed in the figure. At this time, when the bending moments generated in the elastic body 21 by the driving pattern electrodes 23-1 to 23-26 are combined together, a seventh-order progressive wave progressing in the circumferential direction of the elastic body 21 is generated. Particularly when a frequency of the driving voltages to be applied is set at a value close to the natural frequency of the elastic body 21, the seventh-order progressive wave is amplified in the elastic body 21.

Two sensor pattern electrodes 24-1$a$ and 24-2$a$ (sensor phases S1 and S2) acting as sense phases (measurement phases) are also formed in the piezoelectric element 22 with pitches of a one-quarter wavelength ($\lambda$/4) of a seventh-order progressive wave over the entire circumference. The two sensor phases S1 and S2 are placed on the same circumference as the driving pattern electrodes 23-1 to 23-26. It should be noted that although in FIG. 7, the two sensor phases S1 and S2 are placed between the driving pattern electrodes 23-1 and 23-26, the two sensor phases S1 and S2 should not necessarily be placed at these locations. The two sensor phases S1 and S2 may be placed at arbitrary locations as long as they are on the same circumference as the driving pattern electrodes 23-1 to 23-26.

The sensor phases S1 and S2 convert a mechanical distortion of the vibration body 20, which occurs due to a driving vibration or undesired vibration, into an output signal, which is an AC signal, through a piezoelectric effect and outputs the output signal. Namely, the sensor phases S1 and S2 monitor amplitudes of driving vibrations and undesired vibrations. Output signals from the sensor phases S1 and S2 are sent to the undesired vibration detection unit 17 through the flexible print circuit board, not shown. The undesired vibration detection unit 17 calculates an amplitude ratio (comparison result) between the output signals obtained from the sensor phases S1 and S2 and detects an undesired vibration based on the amplitude ratio. A method of detecting an undesired vibration will now be described with reference to FIGS. 8A, 8B, 17A, and 17B.

Figure 8A:
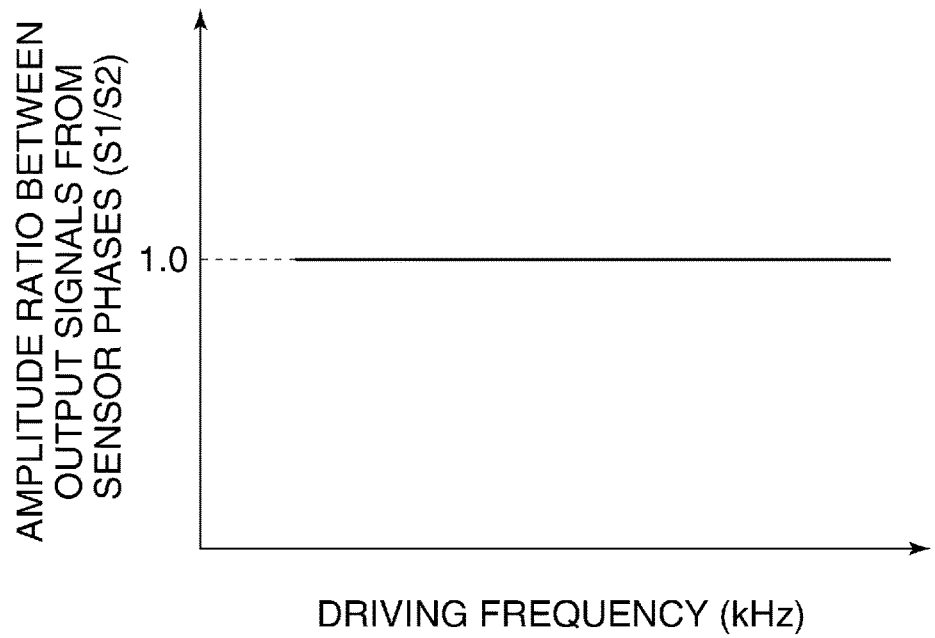
FIGS. 8A and 8B are views useful in explaining a method of detecting an undesired vibration according to the first embodiment.
Figure 8B:
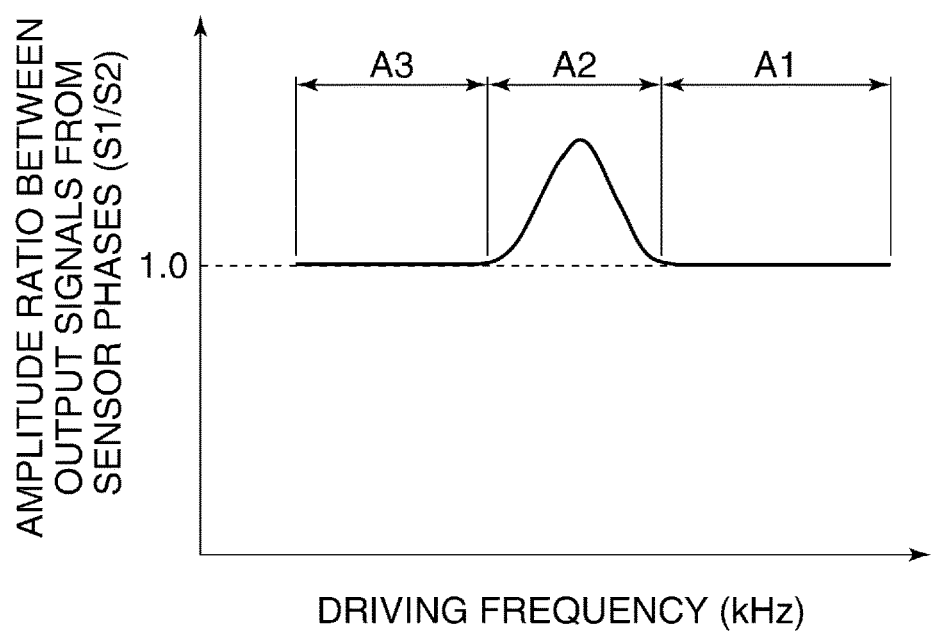
Figure 17A:
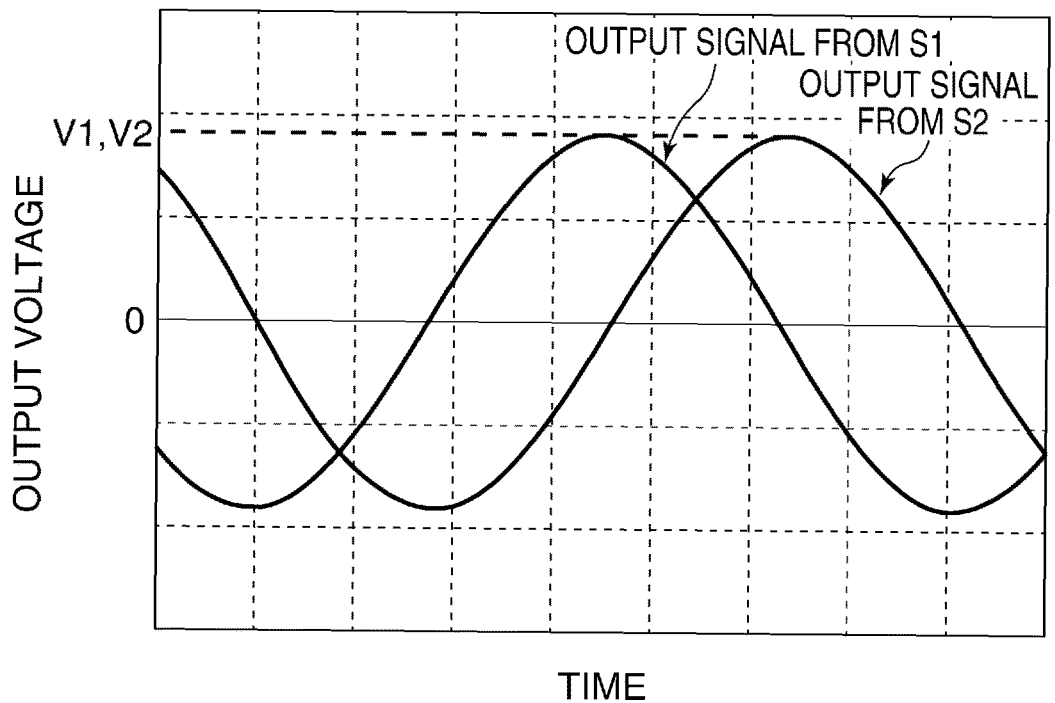
FIGS. 17A and 17B are diagrams useful in explaining a method of detecting an undesired vibration according to the first embodiment.

FIGS. 8A, 8B, 17A, and 17B are views useful in explaining the method of detecting an undesired vibration according to the first embodiment. When only a driving vibration is excited in the vibrating body 20, amplitudes of the driving vibration at the respective positions in the circumferential direction of the vibrating body 20 are the same as described earlier. Thus, as shown in FIG. 17A, the amplitudes at the locations where the two sensor phases S1 and S2 are placed are the same as well, and the amplitude ratio between the output signals from the two sensor phases S1 and S2 is 1.0 as shown in FIG. 8A. It should be noted that in the graph of FIG. 8A, the horizontal axis represents the frequency (driving frequency) (kHz) of driving voltage from the AC voltage generating unit 16, and the vertical axis represents the amplitude ratio (S1/S2) between the output signals from the two sensor phases S1 and S2.

Figure 17B:
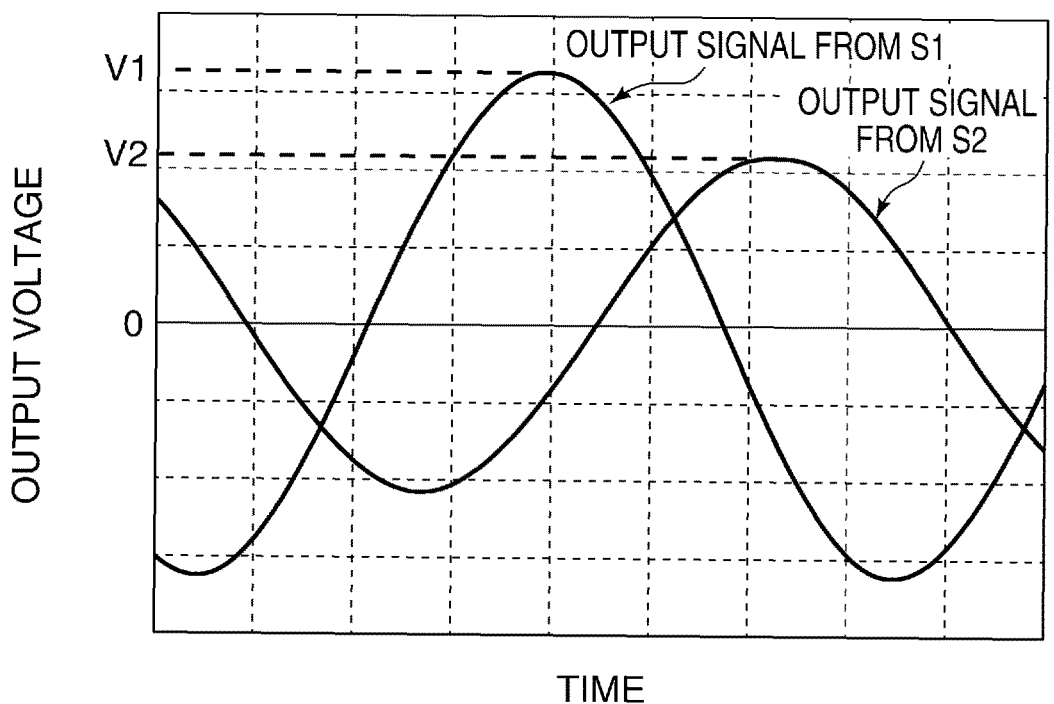

As described earlier, an undesired vibration in the vibrating body 20 may occur within the range of the driving frequencies due to factors such as low precision of the contact surfaces of the contact portions 25 and the contact spring 30$b$. For example, assume that a driving frequency which is a seventh-order progressive wave is excited, and an undesired vibration which is a fourth-order progressive wave is generated in a given partial range of driving frequencies. In this case, when the undesired vibration is superimposed on the driving vibration, the superposed amplitude of the driving frequency and the undesired vibration varies with positions in the circumferential direction of the vibrating body 20 as described above. Thus, as shown in FIG. 17B, the amplitudes at the locations where the two sensor phases S1 and S2 are placed differ from each other, and the amplitude ratio between the output signals from the two sensor phases S1 and S2 is not 1.0 in a partial range A2 of the driving frequencies where the undesired vibration occurs. In partial ranges A1 and A3 where no undesired vibration occurs, only the driving vibration is excited, and hence the amplitude ratio between the output signals from the two sensor phases S1 and S2 is 1.0. Namely, the amplitude ratio between the output signals from the two sensor phases S1 and S2 is calculated, and when the calculated amplitude ratio is not 1.0, it is assumed that an undesired vibration is occurring. Thus, an undesired vibration is reliably detected by calculating the amplitude ratio between the output signals from the two sensor phases S1 and S2. It should be noted that in the partial range A2 in FIG. 8B, the amplitude ratio between the output signals from the two sensor phases S1 and S2 has a maximum value, and the presence of the maximum value indicates presence of a natural frequency. A driving frequency at the maximum value corresponds to a natural frequency of the undesired vibration.

Figure 20:
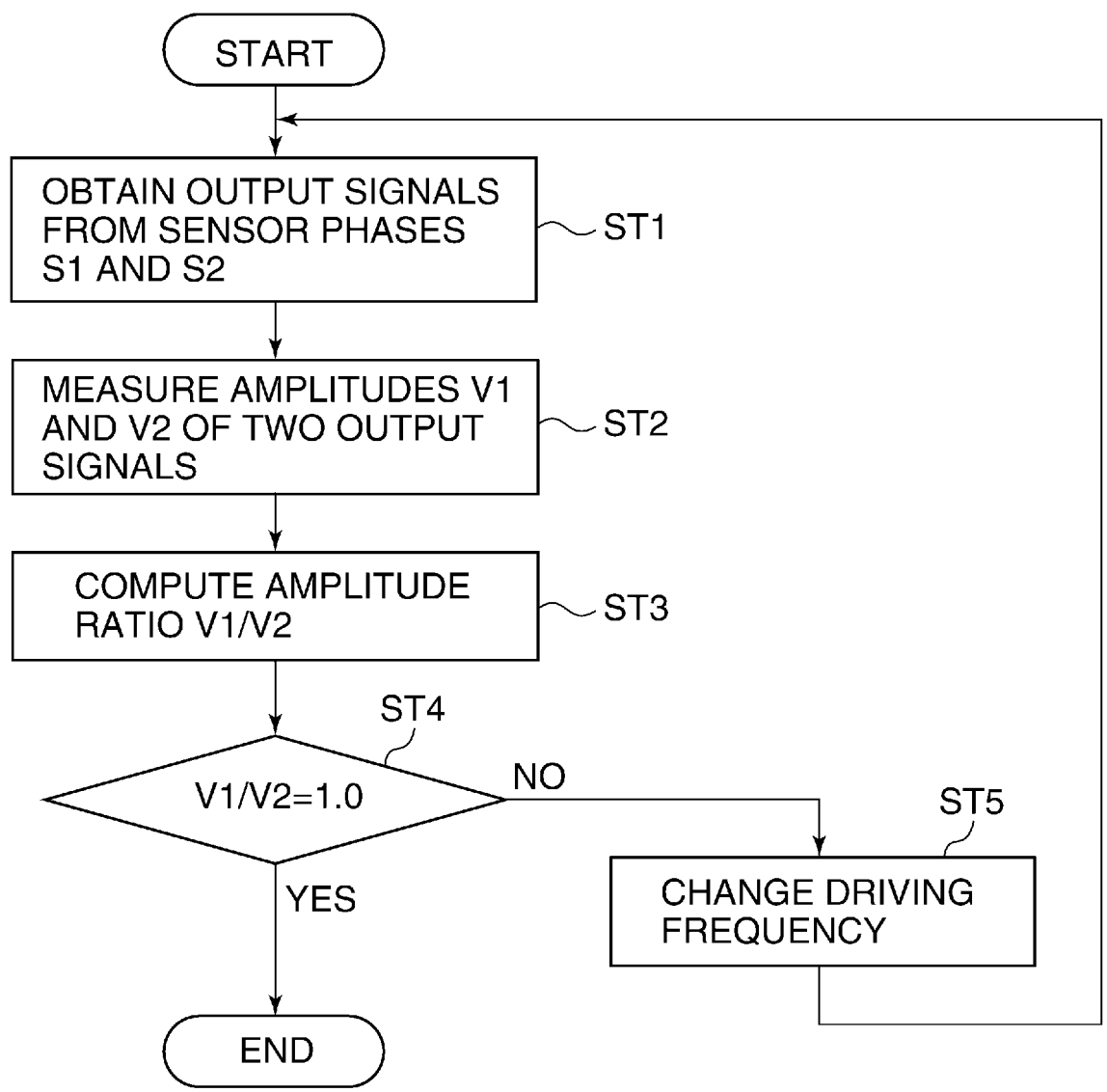
FIG. 20 is a diagram useful in explaining a method of adjusting an undesired vibration according to the first embodiment.

In the first embodiment, it is preferred that the driving frequency is adjusted so that the amplitude ratio between the output signals from the two sensor phases S1 and S2 can be 1.0. FIG. 20 is a view (flowchart) useful in explaining a way to adjust the driving frequency. In this way to adjust the driving frequency, first, output signals from the two sensor phases S1 and S2 are obtained while the vibration body 20 is driven at a predetermined frequency (here, f1 is assumed) (step ST1). Then, amplitudes V1 and V2 of the two output signals from the two sensor phases S1 and S2 are measured (step ST2).

The amplitudes measured in the step ST2 correspond to a maximum value of a distance from a center (node) of vibration to a maximum displacement (antinode of vibration) in a section including one or more cycles (1/f[s]) of the driving frequency f. It should be noted that the amplitudes may be a maximum value of a width between the maximum displacements of vibration (a distance between one antinode of vibration to another antinode of vibration) in the section. Moreover, the amplitudes may be a value obtained by averaging distances from the center of vibration to the maximum displacement of vibration in the section. Further, the amplitudes may be a value obtained by averaging widths between the maximum displacements of vibration in the section.

Then, a value V1/V2 is calculated (derived) from the measured amplitudes V1 and V2 (step ST3). Thereafter, a determination on the value V1/V2 is performed (step ST4). When a determination result of the value V1/V2 is 1.0, driving of the vibrating body 20 at the driving frequency f1 is maintained, and the sequential processes are completed. On the other hand, when a determination result of the value V1/V2 is not 1.0, the driving frequency f1 is changed from the driving frequency (here, f1) with which the determination result of the value is not V1/V2 to a different driving frequency (here, f2 is assumed) (step ST5). The processes from the steps ST1 to ST4 is then performed for the driving frequency f2. These sequential processes (steps ST1 to ST5) are performed until the determination result of the value V1/V2 at step ST4 becomes 1.0, and when the determination result of the value V1/V2 becomes 1.0, driving of the vibrating body 20 at a driving frequency at that point is maintained, and the sequential processes are completed. In this way, a situation in which the amplitude ratio is not 1.0, that is, a situation in which an undesired vibration occurs is avoided.

It should be noted that a change of the driving frequency in the step ST5 may be performed by increasing or decreasing a driving frequency before change by a predetermined frequency, or may be performed randomly. The undesired vibration occurs not only due to variations in the vibrating bodies at the time of manufacturing but due to variations in driving environment, and thus the way of adjusting the driving frequency may be performed every time the driving environment is changed.

Further, the driving frequency at which an undesired vibration occurs obtained during adjustment through the above way of adjusting the driving frequency is stored in advance, and based on the stored driving frequency, the undesired vibration detection unit 17 determines a range of frequencies in which the amplitude ratio is not 1.0 (for example, the partial range A2 in FIG. 8B) and sends the determined range of frequencies to the AC voltage generating unit 16, which in turn adjusts the driving frequency so that the driving frequency can fall outside the partial range A2. This prevents an undesired vibration from occurring due to variations in vibrating bodies at the time of manufacturing or changes in driving environment and causing problems.

It should be noted that the undesired vibration occurs not only due to variations in the vibrating body at the time of manufacturing but due to variations in driving environment, and thus a range of driving frequency at which the amplitude ratio is not 1.0 can be determined at higher accuracy by storing the driving frequency at which the undesired vibration occurs on a driving environment basis.

It should be noted that although in the first embodiment, the driving frequency is adjusted so that the amplitude ratio can be 1.0, the amplitude ratio which is an index for use in adjusting the driving frequency is not limited to 1.0. The reason for this is that, for example, even if frequency components (noise including high-order harmonics) other than the driving frequency are included in the output signals from the two sensor phases S1 and S2, and the calculated amplitude ratio is 1.0, the amplitude ratio may not be 1.0 when effects of the frequency components other than the driving frequency are removed. It is preferred that the amplitude ratio which is an index for use in adjusting the driving frequency is set within a predetermined range, for example, from 0.7 to 0.9. Moreover, to detect an undesired vibration more accurately, it is preferred that the amplitude ratio is calculated after the frequency components other than the driving frequency are subtracted or eliminated from the amplitude ratio which is an index for use in adjusting the driving frequency.

Furthermore, when an undesired vibration occurs in a range of frequencies of high-order harmonics which are 2k (k is a natural number) multiples of the driving vibration, it is preferred that the amplitude ratio is calculated after frequency components other than the harmonics of high orders which are 2k multiples are subtracted or eliminated from the output signals from the two sensor phases S1 and S2.

Moreover, although in the first embodiment, an undesired vibration is detected by using the amplitude ratio based on the amplitudes V1 and V2 of the output signals from the two sensor phases S1 and S2, an undesired vibration may be detected in any manner as long as the state of vibration in the two sensor phases S1 and S2 can be detected. For example, a difference in amplitude between the two sensor phases S1 and S2 may be calculated, and when the difference is not zero, it may be determined that an undesired vibration is occurring. An undesired vibration may also be detected by, for example, comparing a difference between a maximum value and a minimum value (peak to peak) of the output signals from the two sensor phases S1 and S2 or comparing effective values.

Although in the first embodiment described above, it is assumed that the amplitude ratio between the output signals from the two sensor phases S1 and S2 has the maximum value due to the influence of an undesired vibration, the amplitude ratio does not always have the maximum value. For example, an undesired vibration may act in such a direction as to cancel out vibration displacement caused by the driving vibration, and hence the amplitude ratio between the output signals from the two sensor phases S1 and S2 may have a minimum value.

As described above, in the first embodiment, the plurality of sensor phases S1 and S2 is placed at the different locations in the vibrating body 20. When an undesired vibration as well as the driving vibration occurs in the vibrating body 20, the undesired vibration is superimposed on the driving vibration. As a result, the ratio between the amplitudes at the two different locations in the vibrating body 20 in the case where an undesired vibration as well as the driving vibration is occurring differs from the ratio between the amplitudes at the two different locations in the vibrating body 20 in the case where only the driving vibration is excited. Therefore, by measuring the amplitudes at the two different locations in the vibrating body 20, whether or not the ratio between the measured two amplitudes varies is determined to determine whether or not an undesired vibration is occurring. Namely, with the plurality of the sensor phases S1 and S2 placed at the different two locations in the vibrating body 20, an undesired vibration in the vibrating body 20 is detected more accurately than before.

Next, a description will be given of a vibration-type driving apparatus according to a second embodiment of the present invention. The second embodiment is basically the same as the first embodiment described above in terms of constructions and operations. Features of constructions and operations that are the same as those in the first embodiment will thus not be described, only constructions and operations different from those of the first embodiment being described below.

Figure 9:
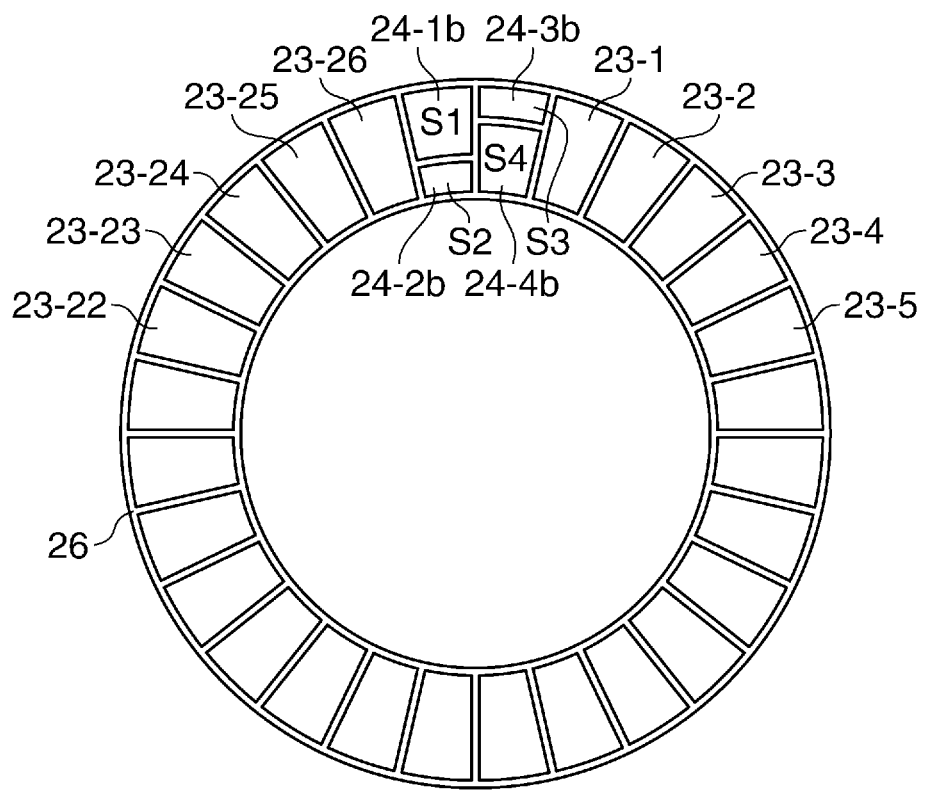
FIG. 9 is a plan view useful in explaining a configuration of a plurality of driving pattern electrodes formed in a piezoelectric element of a vibration-type driving apparatus according to a second embodiment of the present invention.

FIG. 9 is a plan view useful in explaining the configuration of a plurality of driving pattern electrodes formed in a piezoelectric element of the vibration-type driving apparatus according to the second embodiment of the present invention. In the second embodiment, the vibrating body 20 has the elastic body 21 and the piezoelectric element 26. The piezoelectric element 26 has substantially the same arrangement as that of the piezoelectric element 22 and differs from the piezoelectric element 22 only in the number and configuration of sensor pattern electrodes. Four sensor pattern electrodes 24-1b, 24-2b, 24-3b, and 24-4b (four sensor phases S1, S2, S3, S4) are placed in the piezoelectric element 26. The sensor phases S1 and S2 are placed at the same location with respect to a circumferential direction of the piezoelectric element 26, and the sensor phases S3 and S4 are placed at the same location with respect to the circumferential direction of the piezoelectric element 26 as well. The sensor phase S1 is placed on an outer peripheral side of the piezoelectric element 26, and the sensor phase S2 is placed on an inner peripheral side of the piezoelectric element 26. The sensor phase S3 is placed on the outer peripheral side of the piezoelectric element 26, and the sensor phase S4 is placed on the inner peripheral side of the piezoelectric element 26. The sensor phase S3 is shifted from the sensor phase S1 by an amount corresponding to a pitch of a one-quarter wavelength ($\lambda/4$) of a seventh-order progressive wave as viewed in the circumferential direction of the piezoelectric element 26. The sensor phase S4 is shifted from the sensor phase S2 by an amount corresponding to a pitch of a one-quarter wavelength ($\lambda/4$) of a seventh-order progressive wave as viewed in the circumferential direction of the piezoelectric element 26. It should be noted that the sensor phases S1 and S3 placed on the outer peripheral side of the piezoelectric element 26 have mutually different shapes, and the sensor phases S2 and S4 placed on the inner peripheral side of the piezoelectric element 26 have mutually different shapes as well.

The sensor phases S1 to S4 convert a mechanical distortion of the vibrating body 20 resulting from a driving vibration or undesired vibration into an output signal, which is an AC signal, through a piezoelectric effect and outputs the output signal. Namely, the sensor phases S1 to S4 monitor amplitudes of driving vibrations and undesired vibrations. Output signals from the sensor phases S1 to S4 are sent to the undesired vibration detection unit 17 through the flexible print circuit board, not shown. The undesired vibration detection unit 17 calculates an amplitude ratio between the output signals obtained from the two sensor phases S1 and S4 and detects an undesired vibration based on the amplitude ratio. A method of detecting an undesired vibration will be described below with reference to FIGS. 10A, 10B, and 18. It should be noted that the other sensor phases S2 and S3 are grounded.

Figure 10A:
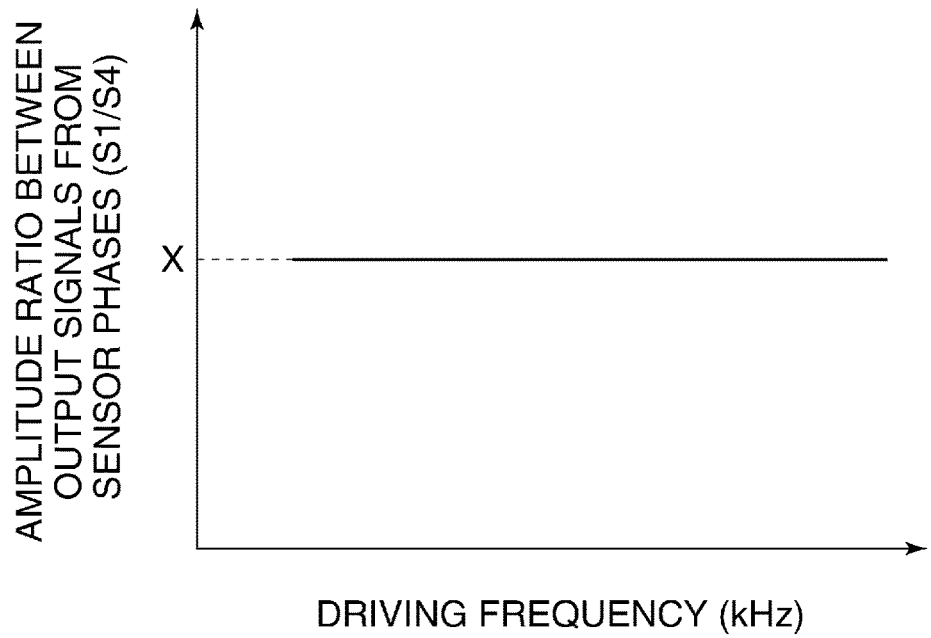
FIGS. 10A and 10B are views useful in explaining a method of detecting an undesired vibration according to the second embodiment.
Figure 10B:
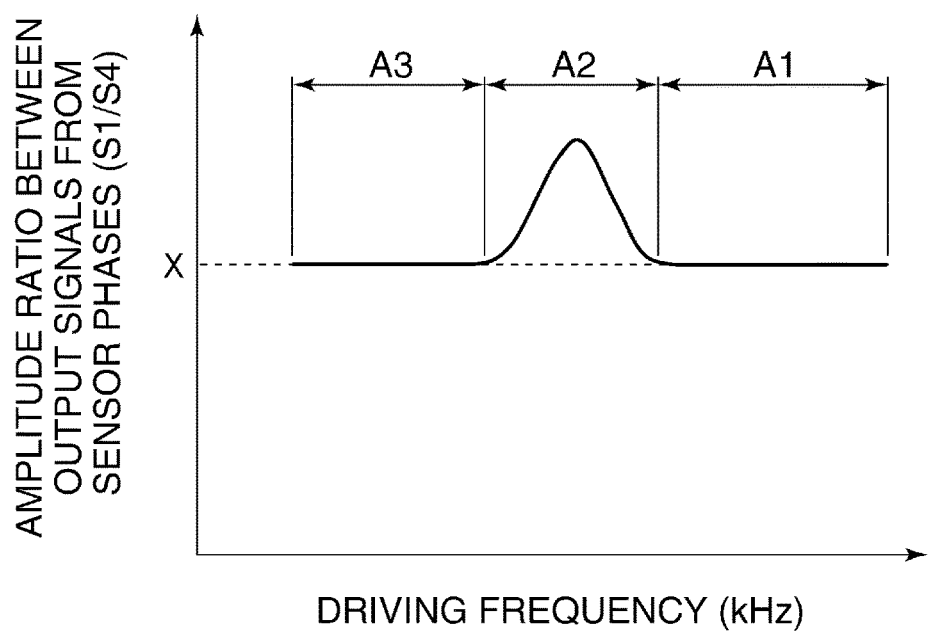
Figure 18:
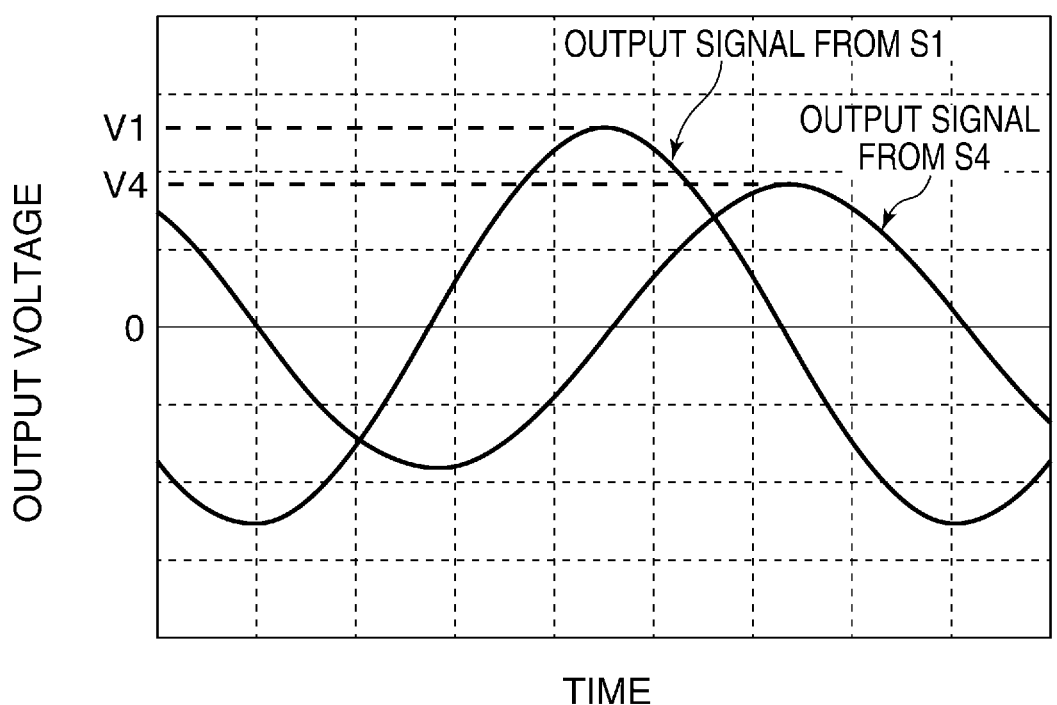
FIG. 18 is a diagram useful in explaining a method of detecting an undesired vibration according to the second embodiment.

FIGS. 10A, 10B, and 18 are views useful in explaining the method of detecting an undesired vibration according to the second embodiment. When only a driving vibration is excited in the vibrating body 20, the amplitudes of the output signals obtained from the two sensor phases S1 and S4 differ as shown in FIG. 18 because the location where the sensor phase S1 is placed and the location where the sensor phase S4 is placed differ in a radial direction. On the other hand, the amplitude at the location where the sensor phase S1 is placed is uniform, and the amplitude at the location where the sensor phase S4 is placed is uniform as well. Therefore, the amplitude ratio between the output signals obtained from the two sensor phases S1 and S4 is kept at a specific value X different from one at all driving frequencies as shown in FIG. 10A. It should be noted that in the graph of FIG. 10A, the horizontal axis represents frequencies (kHz) of driving voltage from the AC voltage generating unit 16, and the vertical axis represents amplitude ratios (S1/S4) of the output signals obtained from the respective sensor phases S1 and S4. In the following description, the ratio (S1/S4) between the amplitude of the output signal from the sensor phase S1 on the outer peripheral side of the piezoelectric element 26 and the amplitude of the output signal from the sensor phase S4 on the inner peripheral side of the piezoelectric element 26 is defined as "the inside-outside amplitude ratio" for the convenience of explanation.

The inside-outside amplitude ratio in a case where an undesired vibration occurs and is superimposed on a driving frequency differs from the inside-outside amplitude ratio (the specific value X) in a case where only a driving frequency is excited. Specifically, as shown in FIG. 10B, in a partial range A2 of driving frequencies where an undesired vibration occurs, the inside-outside amplitude ratio exhibits a different value from the specific value X. On the other hand, in partial ranges A1 and A3 of driving frequencies where no undesired vibration occurs, the inside-outside amplitude ratio exhibits the specific value X because only a driving frequency is excited in the partial ranges A1 and A3. Namely, the inside-outside amplitude ratio is calculated, and when the calculated inside-outside amplitude ratio is not equal to the specific value X, it is assumed that an undesired vibration is occurring. Thus, an undesired vibration is reliably detected by calculating the inside-outside amplitude ratio. It should be noted that in the partial range A2 in FIG. 10B, the inside-outside amplitude ratio has a maximum value, and the presence of the maximum value indicates presence of a natural frequency. A driving frequency at the maximum value corresponds to a natural frequency of the undesired vibration.

Figure 21:
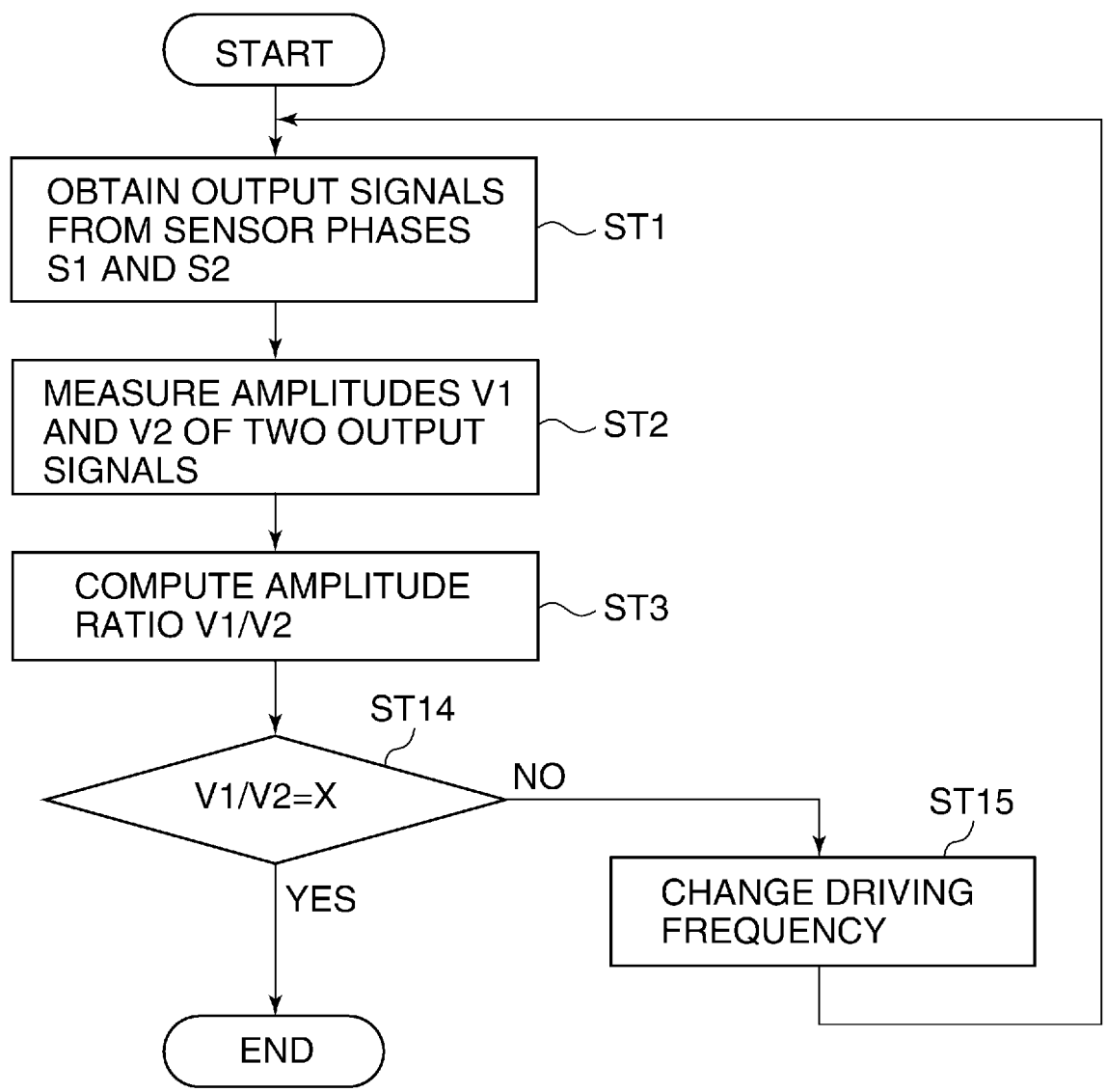
FIG. 21 is a diagram useful in explaining a method of adjusting an undesired vibration according to the second embodiment.

In the second embodiment, it is preferred that the driving frequency is adjusted so that the inside-outside amplitude ratio can be equal to the specific value X. FIG. 21 is a view (flowchart) useful in explaining a way to adjust the driving frequency. Processes in steps ST1 to ST3 are the same as the processes described in the first embodiment, and thus only processes of steps ST14 and ST15 performed instead of the steps ST4 and ST5 in FIG. 20 will be described here. In the step ST14, a determination on a value V1/V2 is performed. When a determination result of the value V1/V2 is X, driving of the vibrating body 20 at the driving frequency f1 is maintained, and the sequential processes are completed. When the determination result of the value V1/V2 is not X, the driving frequency f1 is changed to a driving frequency (here, f2 is assumed) different from a driving frequency (here, f1) of a case where the determination result of the value V1/V2 is not X up to this point (step ST15). In this way, a situation in which the inside-outside amplitude ratio is not equal to the specific value X, that is, a situation in which an undesired vibration occurs is avoided.

It should be noted that a change in the driving frequency in the step ST15 may be performed by increasing or decreasing the driving frequency before change by a predetermined frequency, or may be performed randomly. The undesired vibration occurs not only due to variations in the vibrating body at the time of manufacturing but due to variations in driving environment, and thus the way of adjusting the driving frequency may be performed every time the driving environment is changed.

Further, the driving frequency at which an undesired vibration occurs obtained during adjustment through the above way of adjusting the driving frequency is stored in advance, and based on the stored driving frequency, the undesired vibration detection unit 17 determines a range of frequencies in which the inside-outside amplitude ratio is not equal to the specific value X (for example, the partial range A2 in FIG. 10B) and sends the determined range of frequencies to the AC voltage generating unit 16, which in turn adjusts the driving frequency so that the driving frequency can fall outside the partial range A2. This prevents an undesired vibration from occurring due to variations in vibrating bodies at the time of manufacturing or changes in driving environment and causing problems.

It should be noted that the undesired vibration occurs not only due to variations in the vibrating body at the time of manufacturing but due to variations in driving environment, and thus a range of driving frequency at which the inside-outside amplitude ratio is not equal to the specific value X can be determined at higher accuracy by storing the driving frequency at which the undesired vibration occurs on a driving environment basis.

In the second embodiment, the two sensor phases S1 and S4 for use in detecting an undesired vibration are placed at different locations (on the inner peripheral side and the outer peripheral side, respectively) with respect to the radial direction of the vibrating body 20. Here, an undesired vibration superimposed on a driving vibration is a vibration in a twist mode, and in a vibration in the twist mode, the magnitude of distortion caused by vibration displacement differs between the inner peripheral side and the outer peripheral side. With the arrangement according to the second embodiment, a maximum value clearly appears as compared to the arrangement in which the two sensor phases are placed at substantially the same location with respect to the radial direction of the vibrating body 20. Therefore, as compared to the first embodiment, judgment as to the presence of the partial range A2 is easy, and hence an undesired vibration is reliably detected.

It should be noted that there may be cases where frequency components (noise including high-order harmonics) other than driving frequencies are included in the output signals from the two sensor phases S1 and S4. It is thus preferred that the inside-outside amplitude ratio is calculated after frequency components other than driving frequencies are subtracted or eliminated from the inside-outside amplitude ratio which is an index for use in adjusting the driving frequency.

Furthermore, when an undesired vibration occurs in a range of frequencies of high-order harmonics which are 2k (k is a natural number) multiples of driving frequencies, it is preferred that the inside-outside amplitude ratio is calculated after frequency components other than the high-order harmonics that are 2k multiples are subtracted or eliminated from the output signals from the two sensor phases S1 and S4.

Moreover, although in the second embodiment, an undesired vibration is detected by using the inside-outside amplitude ratio, an undesired vibration may be detected in any manner as long as variations in the amplitudes of the output signals from the two sensor phases S1 and S4 can be recognized. For example, a difference in amplitude between the two sensor phases S1 and S4 may be calculated on a regular basis, and when the calculated difference varies, it may be determined that an undesired vibration has occurred. An undesired vibration may also be detected by, for example, comparing a difference between a maximum value and a minimum value (peak to peak) of output signals from the two sensor phases S1 and S4 or comparing effective values.

It should be noted that although in the second embodiment described above, it is assumed that the inside-outside amplitude ratio has a maximum value due to the influence of an undesired vibration, the inside-outside amplitude ratio does not always have a maximum value. For example, an undesired vibration may act in such a direction as to cancel out vibration displacement resulting from a driving vibration, and hence the inside-outside amplitude ratio may have a minimum value.

Further, although in the second embodiment, an undesired vibration is detected by using the amplitude ratio between output signals from the two sensor phases S1 and S4, an amplitude ratio of output signals from the two sensor phases S2 and S3 may be used. Output signals from three or more sensors may also be used. For example, an undesired vibration may be detected by using a ratio between a value obtained by averaging amplitude values of output signals from the two sensor phases S1 and S3 on the outer peripheral side and a value obtained by averaging amplitude values of output signals from the two sensor phases S2 and S4 on the inner peripheral side.

Figure 11:
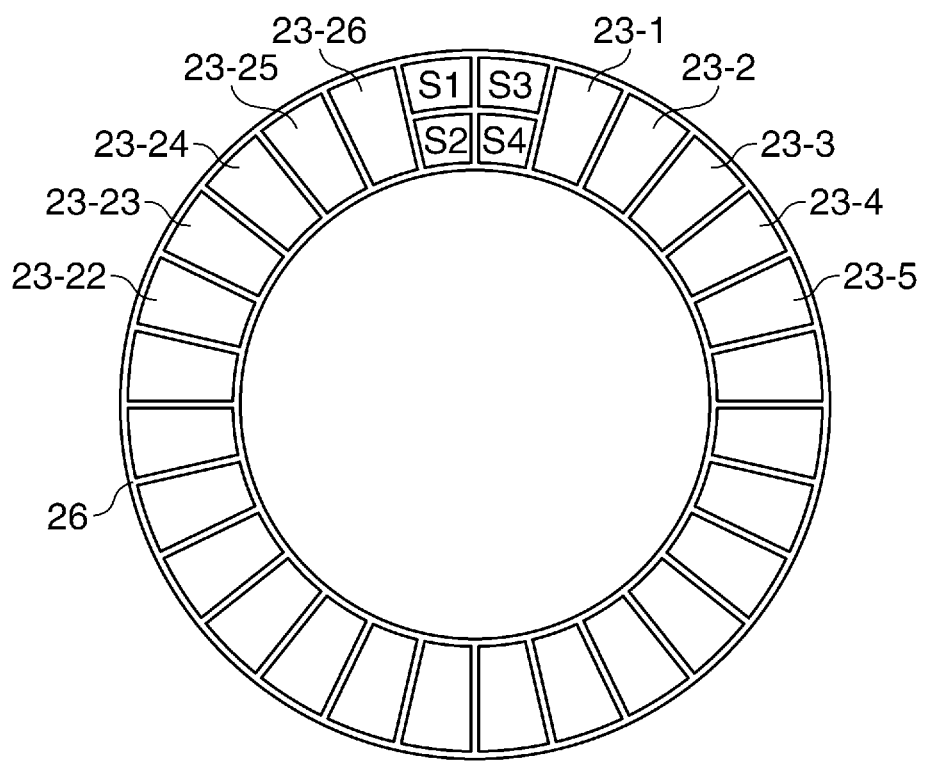
FIG. 11 is a plan view useful in explaining a first variation of a configuration of sensor phases in the piezoelectric element in FIG. 9.
Figure 12:
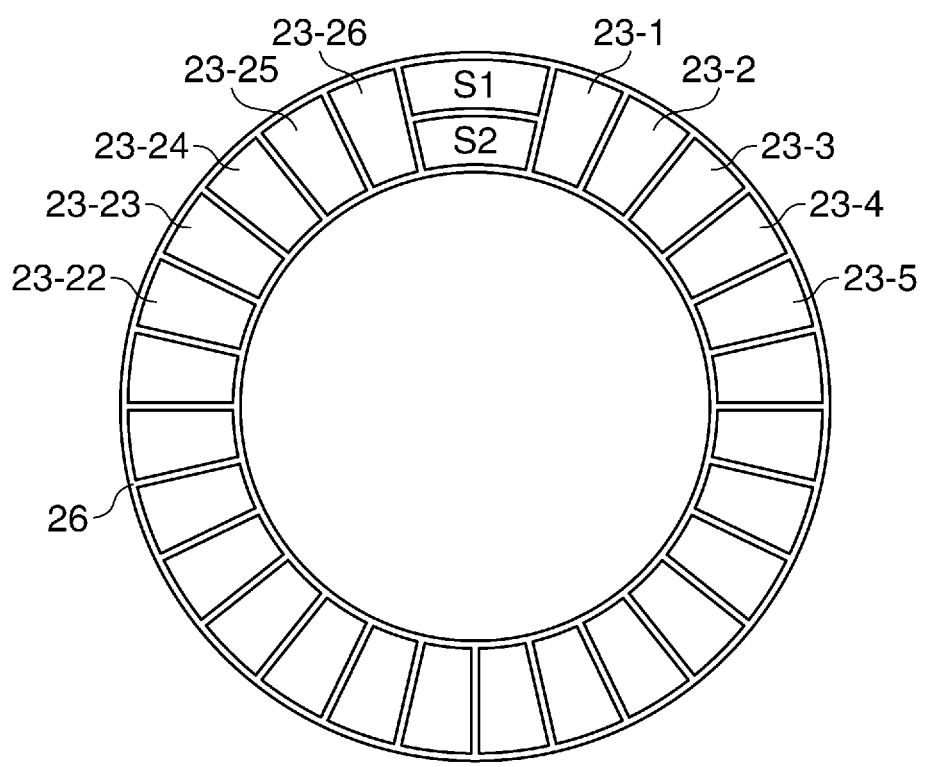
FIG. 12 is a plan view useful in explaining a second variation of a configuration of sensor phases in the piezoelectric element in FIG. 9.
Figure 19:
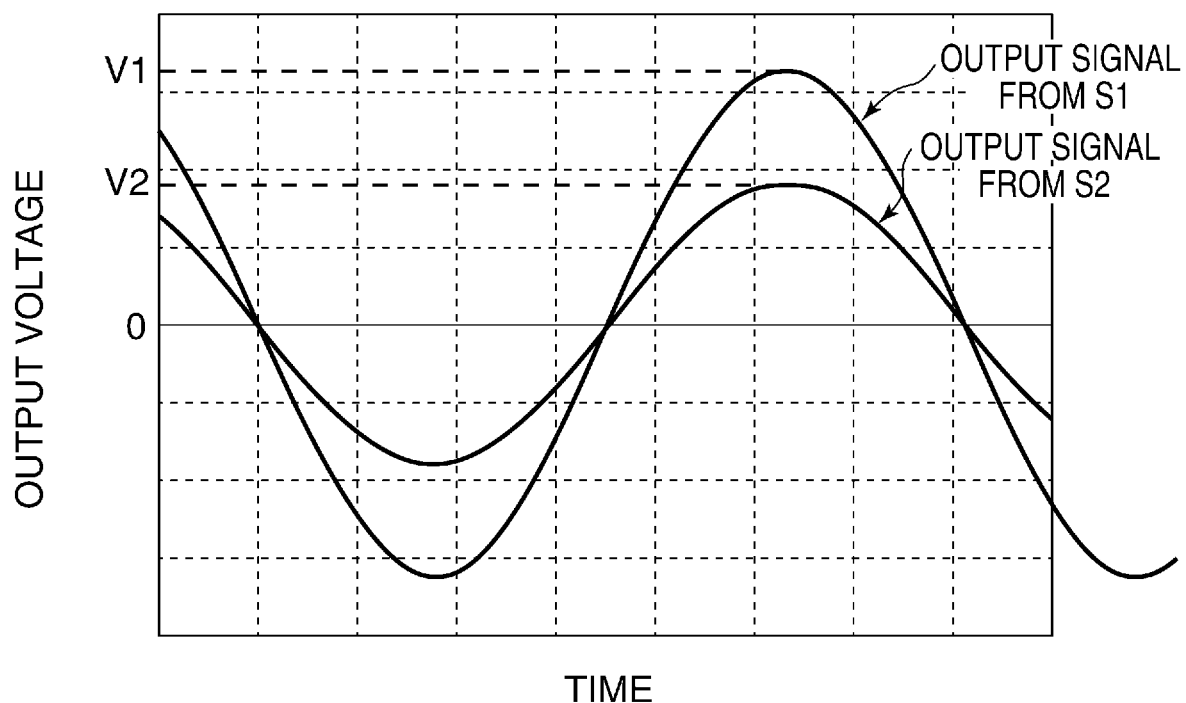
FIG. 19 is a diagram useful in explaining a method of detecting an undesired vibration according to a second variation of the second embodiment.

It should be noted that the number and configuration of the sensor phases in the piezoelectric element of the vibration-type driving apparatus according to the second embodiment are not limited to those illustrated in FIG. 9. For example, as shown in FIG. 11, the sensor phases S1 and S3 on the outer peripheral side of the piezoelectric element 26 may have the same shape, and the sensor phases S2 and S4 on the inner peripheral side of the piezoelectric element 26 may have the same shape as well. Moreover, as shown in FIG. 12, only the two sensor phases S1 and S2 may be placed in the piezoelectric element 26. For example, the sensor phase S1 is placed on the outer peripheral side of the piezoelectric element 26, the sensor phase S2 is placed on the inner peripheral side of the piezoelectric element 26, and the sensor phases S1 and S2 are placed at the same location with respect to the circumferential direction of the piezoelectric element 26. In this case, when only a driving vibration is generated, the amplitude ratio between the sensor phases S1 and S2 is equal to a fixed specific value X'. In a vibration in a twist mode where an undesired vibration that occurs has a circular node, magnitudes of distortion resulting from vibration displacement differs between the inner peripheral side and the outer peripheral side of the piezoelectric element 26. Thus, even though the sensor phases S1 and S2 are at the same location with respect to the circumferential direction, the amplitudes of output signals from the sensor phases S1 and S2 differ in the rate of change as indicated by output signals from the respective sensor phases S1 and S2 in FIG. 19, and the amplitude ratio between the output signals from the sensor phases S1 and S2 is not equal to the fixed specific value X'. Therefore, an undesired vibration is accurately detected based on a variation in the inside-outside amplitude ratio.

Moreover, when the piezoelectric element 26 has the sensor phase layouts shown in FIG. 9 or 11, not only the inside-outside amplitude ratio but also the amplitude ratio between output signals from the sensor phases S1 and S3 placed at the different locations with respect to the circumferential direction may be calculated as with the first embodiment. In this case, when the inside-outside amplitude ratio is not equal to the specific value X or when the amplitude ratio between the output signals from the sensor phases S1 and S3 is not equal to 1.0, it is determined that an undesired vibration is occurring.

A description will now be given of an application example of the vibration-type driving apparatuses according to the first embodiment and the second embodiment described above. First, a description will be given of a robot that is a third embodiment of the present invention.

Figure 13:
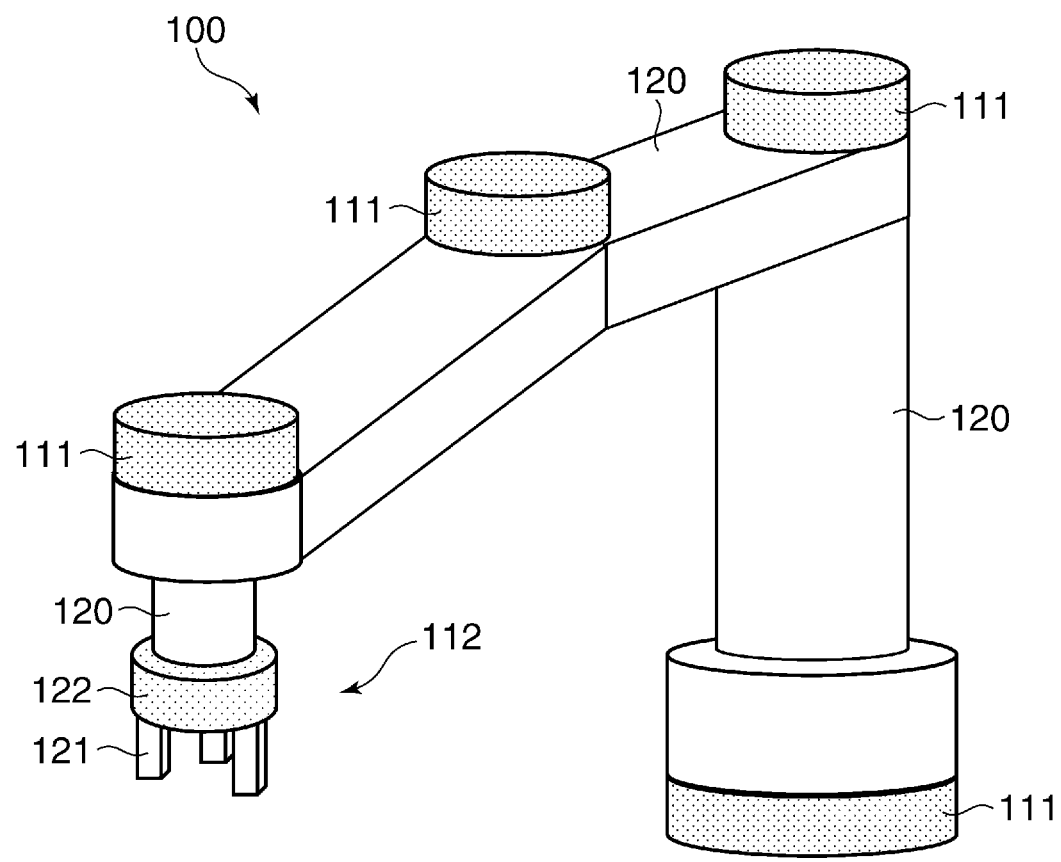
FIG. 13 is a perspective view schematically showing an arrangement of a robot that is a third embodiment of the present invention.

FIG. 13 is a perspective view schematically showing an arrangement of the robot that is the third embodiment of the present invention. Referring to FIG. 13, the robot 100 is, for example, a horizontal multi-axis articulated arm robot and equipped with the vibration-type actuators 10. The robot 100 has a hand unit 112 provided at an end thereof, a plurality of arms 120, and arm articulation units 111 which connect the plurality of arms 120 together or are provided at ends of the arms 120. The arm articulation units 111, each of which has the vibration-type actuator 10, change an angle at which the two arms 120 cross each other, or rotate the arm 120 about their own thrust axes. The hand unit 112 has the arm 120, a holding unit 121 mounted at an end of the arm 120, and a hand articulation unit 122 which connects the arm 120 and the holding unit 121 together. The hand articulation unit 122 has the vibration-type actuator 10 as well and rotatively drives the holding unit 121. It should be noted that the control circuit 15 controls operation of the vibration-type actuators 10. How the control circuit 15 controls operation of the vibration-type actuators 10 has already been described in the description of the first embodiment and the second embodiment.

Figure 14A:
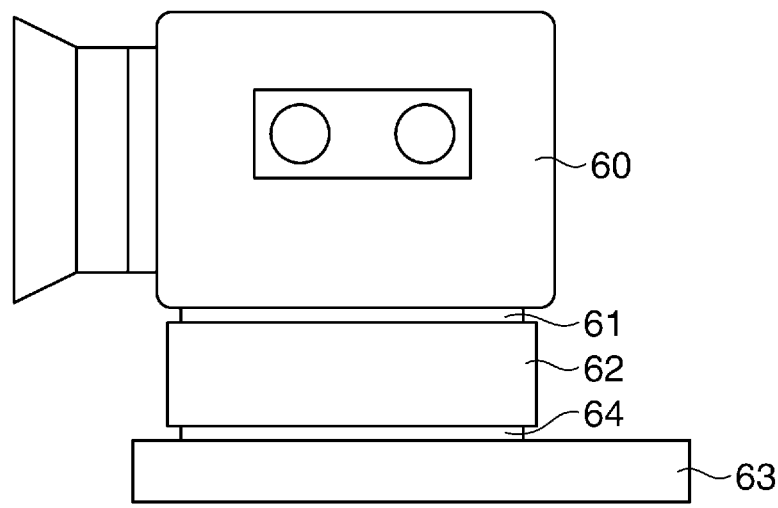
FIGS. 14A and 14B are views schematically showing an arrangement of a pan head for an image pickup apparatus, which is a fourth embodiment of the present invention.
Figure 14B:
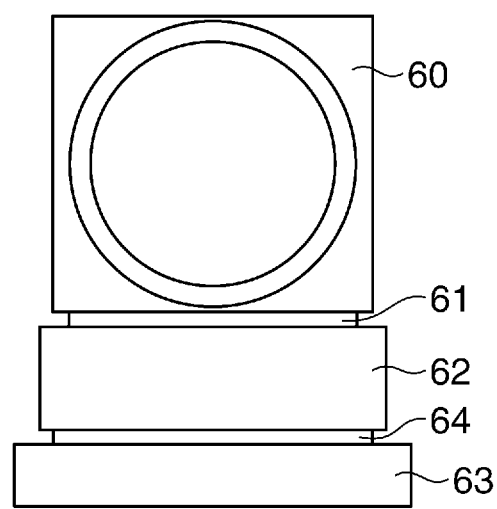

A description will now be given of a pan head for an image pickup apparatus, which is a fourth embodiment of the present invention. FIGS. 14A and 14B are views schematically showing an arrangement of the pan head for the image pickup apparatus, which is the fourth embodiment of the present invention. FIG. 14A is a side view, and FIG. 14B is a front view. Referring to FIGS. 14A and 14B, the pan head has a stage 61 on which a surveillance camera 60, which is the image pickup apparatus, is mounted, a rotary base 62, and a pan head main body 63. The stage 61 is rotatably supported by the rotary base 62 provided on the pan head main body 63. A vibration-type driving apparatus 64 provided between the pan head main body 63 and the rotary base 62 has the vibration-type actuator 10 to rotate the rotary base 62 about a rotational axis. Thus, a shooting direction of the surveillance camera 60 is varied with respect to a horizontal direction by rotating the rotary base 62. By applying the vibration-type actuator 10 to the vibration-type driving apparatus 64, the thickness of vibration-type driving apparatus 64 is reduced. Moreover, since the vibration-type actuator 10 directly drives the rotary base 62, there is no need to have a reduction gear. As a result, the size of the pan head is reduced.

Figure 15:
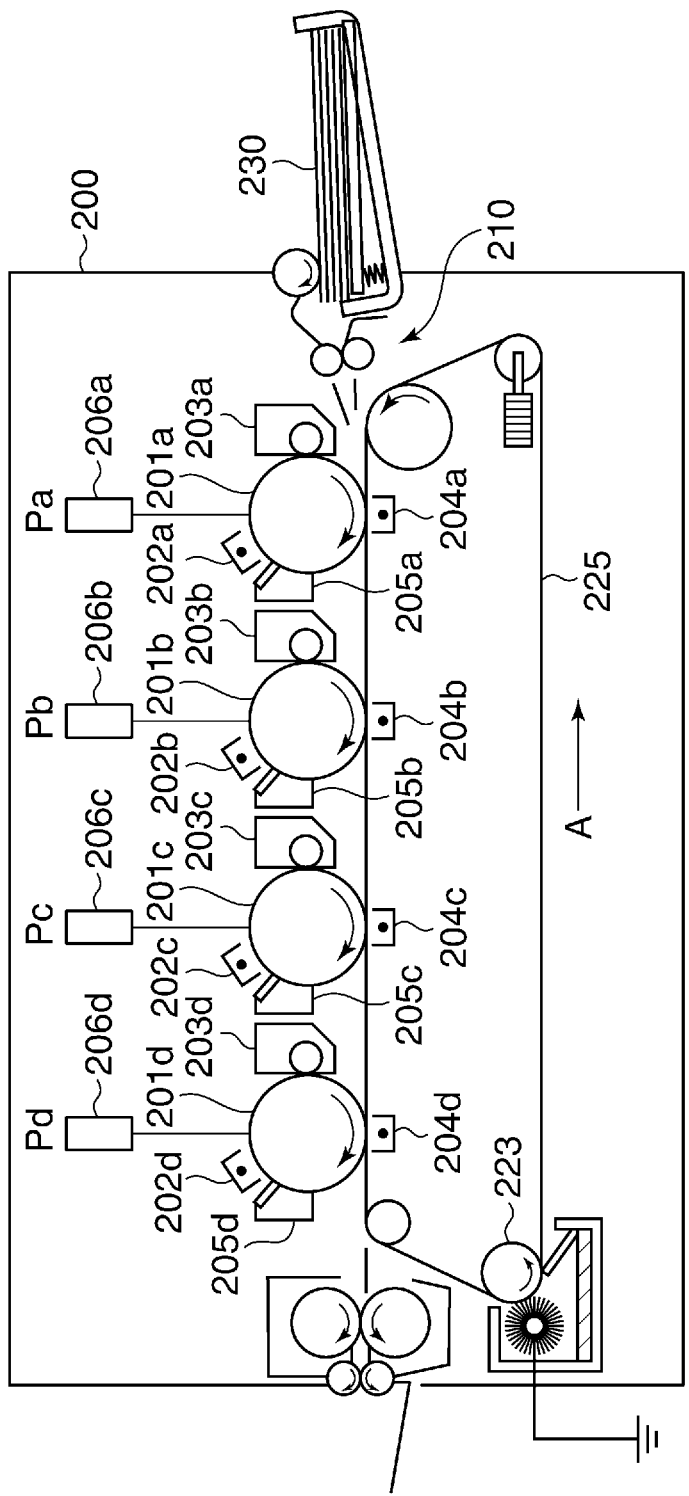
FIG. 15 is a side view schematically showing an internal arrangement of an image forming apparatus that is a fifth embodiment of the present invention.

A description will now be given of an image forming apparatus that is a fifth embodiment of the present invention. FIG. 15 is a side view schematically showing an internal arrangement of the image forming apparatus that is the fifth embodiment of the present invention. Referring to FIG. 15, the color image forming apparatus 200 has four image forming units Pa to Pd. It should be noted that the number of image forming units is not limited to four. The four image forming units Pa to Pd have substantially the same arrangement and have respective photosensitive drums 201a to 201d which are rotatively-driven image carriers. Chargers 202a to 202d, which uniformly charge the respective photosensitive drums 201a to 201d with electricity, are placed on peripheries of the respective photosensitive drums 201a to 201d. On peripheries of the respective photosensitive drums 201a to 201d, developing devices 203a to 203d, chargers 204a to 204d, and cleaning devices 205a to 205d are placed in order in rotational directions of the photosensitive drums 201a to 201d. The developing devices 203a to 203d develop electrostatic latent images formed on surfaces of the respective photosensitive drums 201a to 201d. The chargers 204a to 204d transfer the respective developed toner images to a sheet 230. The cleaning devices 205a to 205d remove toner remaining on the respective photosensitive drums 201a to 201d. Exposure devices 206a to 206d are placed above the respective photosensitive drums 201a to 201d.

A conveying belt 225, which is placed in opposed relation to and in contact with the photosensitive drums 201a to 201d, supports the sheet 230, which is a transfer material fed through a feeding unit 210, and is driven by a driving roller 223 in a direction indicated by an arrow A in the figure. The conveying belt 225 and the driving roller 223 constitute a conveying unit that conveys the sheet 230 successively to the image forming units Pa to Pd. The photosensitive drums 201a to 201d and the driving roller 223 are rotatively driven by respective drive motors, not shown, and each of the drive motor is comprised of the vibration-type actuator 10. It should be noted that the control circuit 15 controls operation of the vibration-type actuator 10. How the control circuit 15 controls operation of the vibration-type actuator 10 has already been described in the description of the first embodiment and the second embodiment.

Figure 16A:
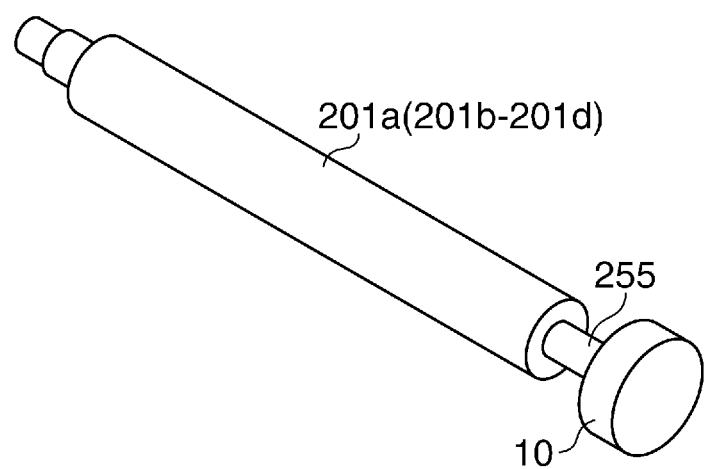
FIGS. 16A and 16B are views showing application examples of a vibration-type actuator in the color image forming apparatus in FIG. 15.
Figure 16B:
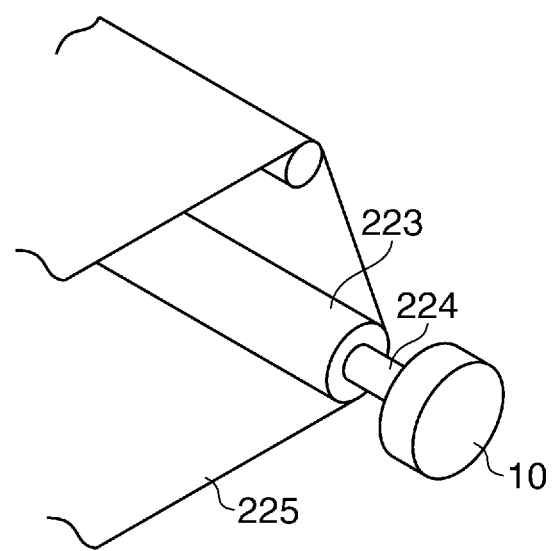

FIGS. 16A and 16B are views showing application examples of the vibration-type actuator 10 in the color image forming apparatus 200 in FIG. 15. FIG. 16A shows a case where the vibration-type actuator 10 is applied to the driving motor for the photosensitive drum 201a (201b to 201d), and FIG. 16B shows a case where the vibration-type actuator 10 is applied to the driving motor for the driving roller 223. Referring to FIG. 16A, the vibration-type actuator 10 acting as the driving motor is directly connected to a drive shaft 255 of the photosensitive drum 201a (201b to 201d). This dispenses with reduction units such as gears for driving the photosensitive drum 201a and the like and therefore reduces the occurrence of color misregistration caused by backlashes of gears or the like to thus improve printing quality of the color image forming apparatus 200. Referring to FIG. 16B, the vibration-type actuator 10 acting as the driving motor is directly connected to a drive shaft 224 of the driving roller 223. This achieves the same effects as the above described effects obtained in the case where the photosensitive drum 201a is driven by the vibration-type actuators 10.

It should be noted that although in the first and second embodiments, the driven body 30b is equipped with the contact spring 30b for stabilizing the state of contact between the vibrating body 20 and the driven body 30, the vibrating body 20 may be equipped with the contact spring 30b. Moreover, although in the first and second embodiments, the vibrating body 20 is fixed to the housing 52 by the supporting portion 21c of the elastic body 21, the vibrating body 20 may not have the supporting portion 21c and may be supported by a member such as felt interposed between the piezoelectric element 22 of the vibrating body 20 and the housing 52.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-086275, filed Apr. 25, 2017 and Japanese Patent Application No. 2018-074115, filed Apr. 6, 2018, which are hereby incorporated by reference herein in their entirety.

What is claimed is:

1. A vibration-type driving apparatus that has a ring-shaped vibrating body having an electro-mechanical energy conversion element and a driven body that comes into contact with the vibrating body, and drives the driven body by generating a driving vibration in the vibrating body through application of driving voltage to the electro-mechanical energy conversion element, comprising:
   a detection unit configured to detect a vibration of the vibrating body,
   wherein the electro-mechanical energy conversion element has a first measurement phase configured to output a first output signal corresponding to the vibration of the vibrating body and a second measurement phase placed at a different location in the vibrating body from the first measurement phase and being configured to output a second output signal corresponding to the vibration of the vibrating body, and
   the detection unit detects the vibration of the vibrating body by using a result of a comparison between the first output signal output from the first measurement phase and the second output signal output from the second measurement phase.

2. The vibration-type driving apparatus according to claim 1, wherein the detection unit detects the vibration of the vibrating body by using a first amplitude obtained from the first output signal output from the first measurement phase and a second amplitude obtained from the second output signal output from the second measurement phase.

3. The vibration-type driving apparatus according to claim 2, wherein the detection unit detects the vibration of the vibrating body by using a ratio or difference between the first amplitude and the second amplitude.

4. The vibration-type driving apparatus according to claim 1, wherein the driving vibration is a first progressive wave progressing in a circumferential direction of the vibrating body, an undesired vibration that may occur in the vibrating body is a second progressive wave progressing in the circumferential direction of the vibrating body, and an order of the driving vibration differs from an order of the undesired vibration.

5. The vibration-type driving apparatus according to claim 4, wherein the undesired vibration that may occur in the vibrating body is a vibration in a twist mode in which a circle that is substantially concentric with the vibrating body is a node.

6. The vibration-type driving apparatus according to claim 1, wherein a location of the first measurement phase with respect to a circumferential direction of the vibrating body differs from a location of the second measurement phase with respect to the circumferential direction of the vibrating body.

7. The vibration-type driving apparatus according to claim 1, wherein a location of the first measurement phase with respect to a radial direction of the vibrating body differs from a location of the second measurement phase with respect to the radial direction of the vibrating body.

8. The vibration-type driving apparatus according to claim 1, wherein the electro-mechanical energy conversion element has another measurement phase different from the first measurement phase and the second measurement phase.

9. A robot comprising:
   an arm; and
   an articulation unit connected to the arm,
   wherein the articulation unit has the vibration-type driving apparatus according to claim 1.

10. A pan head for an image pickup apparatus, comprising:
   an image pickup apparatus;
   a rotary base on which the image pickup apparatus is mounted; and
   the vibration-type driving apparatus according to claim 1 which rotatively drives the rotary base.

11. An image forming apparatus comprising:
   an image carrier;
   a conveying belt provided in opposed relation to the image carrier; and
   the vibration-type driving apparatus according to claim 1 which rotatively drives the image carrier.

12. A control method for a vibration-type driving apparatus that has a ring-shaped vibrating body having an electro-mechanical energy conversion element and a driven body that comes into contact with the vibrating body, and drives the driven body by generating a driving vibration in the vibrating body through application of driving voltage to the electro-mechanical energy conversion element, the control method comprising:
   obtaining a ratio or difference between at least two amplitudes measured by a first measurement phase and a second measurement phase, respectively, placed at different locations of the vibrating body; and
   detecting a vibration of the vibrating body based on the obtained ratio or difference.

13. The control method according to claim 12, wherein a frequency of the driving voltage is adjusted based on the obtained ratio or difference.

14. A non-transitory computer-readable storage medium storing a program for causing a computer to execute a control method for a vibration-type driving apparatus that has a ring-shaped vibrating body having an electro-mechanical energy conversion element and a driven body that comes into contact with the vibrating body, and drives the driven body by generating a driving vibration in the vibrating body through application of driving voltage to the electro-mechanical energy conversion element,
   the control method comprising:
   obtaining a ratio or difference between at least two amplitudes measured by a first measurement phase and a second measurement phase, respectively, placed at different locations of the vibrating body; and
   detecting a vibration of the vibrating body based on the obtained ratio or difference.

15. The storage medium according to claim 14, wherein a frequency of the driving voltage is adjusted based on the obtained ratio or difference.

* * * * *